United States Patent
Hsu

(10) Patent No.: US 11,048,296 B2
(45) Date of Patent: Jun. 29, 2021

(54) FOLDING LENGTH DIFFERENCE COMPENSATORY MECHANISM FOR THE MULTI-FOLDABLE TYPE DEVICE

(71) Applicant: Jarllytec Co., Ltd., New Taipei (TW)

(72) Inventor: Yu-Tsun Hsu, New Taipei (TW)

(73) Assignee: Jarllytec Co., Ltd., New Taipei (TW)

( * ) Notice: Subject to any disclaimer, the term of this patent is extended or adjusted under 35 U.S.C. 154(b) by 0 days.

(21) Appl. No.: 16/852,812

(22) Filed: Apr. 20, 2020

(65) Prior Publication Data
US 2020/0371553 A1    Nov. 26, 2020

(30) Foreign Application Priority Data

May 21, 2019 (TW) .................................. 108117427

(51) Int. Cl.
*G06F 1/16* (2006.01)
(52) U.S. Cl.
CPC .......... *G06F 1/1616* (2013.01); *G06F 1/1624* (2013.01); *G06F 1/1641* (2013.01)
(58) Field of Classification Search
CPC .... G06F 1/1616; G06F 1/1641; G06F 1/1624; G06F 1/1652; G06F 1/1681
See application file for complete search history.

(56) References Cited

U.S. PATENT DOCUMENTS

| | | | | |
|---|---|---|---|---|
| 8,928,552 | B2 * | 1/2015 | Aono ..................... | G06F 1/1624 345/1.3 |
| 9,071,673 | B2 * | 6/2015 | Choi .................... | H04M 1/0247 |
| 9,714,533 | B2 * | 7/2017 | Kuramochi ........... | G06F 1/1618 |
| 10,364,598 | B2 * | 7/2019 | Tazbaz .................. | G06F 1/1681 |
| 10,754,395 | B2 * | 8/2020 | Sanchez ................ | G06F 1/1658 |
| 2011/0126141 | A1 * | 5/2011 | King .................... | G06F 3/04817 715/769 |
| 2012/0120627 | A1 * | 5/2012 | O'Connor ............. | G06F 1/1641 361/807 |
| 2012/0149438 | A1 * | 6/2012 | Kwon ................... | H04M 1/022 455/566 |

(Continued)

FOREIGN PATENT DOCUMENTS

| CN | 105339887 B | 2/2016 |
|---|---|---|
| CN | 105788452 A | 7/2016 |

(Continued)

*Primary Examiner* — Abhishek M Rathod
(74) *Attorney, Agent, or Firm* — Muncy, Geissler, Olds & Lowe, P.C.

(57) ABSTRACT

The present invention provides a folding-length-difference compensatory mechanism for the multi-step foldable device. Two bases are connected by three hinge module, such that the matched flexible display can be turned in folded or unfolded states. Each base includes two housings that slide relative to each other, and each hinge module includes a main body and two sliding units. One end of main linkage members and one end of sub-linkage members of sliding units are pivotally connected to the two main pivoting portions of each end of each main body, and the opposite ends of each main linkage member and each sliding member are respectively connected to the housing. The guiding structure is provided on the side and the end between the two housings of the two bases, and/or a support plate body that can be swung is provided on one housing of the two bases.

15 Claims, 27 Drawing Sheets

(56) References Cited

U.S. PATENT DOCUMENTS

2015/0362958 A1* 12/2015 Shang ................. E05D 5/04
                                                361/679.58
2019/0243424 A1*  8/2019 Lee ................. G06F 1/1616
2020/0355216 A1* 11/2020 Bae ................. G06F 1/1616

FOREIGN PATENT DOCUMENTS

CN       105788458 A    7/2016
CN       110206814 A    9/2019

* cited by examiner

FOLDING LENGTH DIFFERENCE COMPENSATORY MECHANISM FOR THE MULTI-FOLDABLE TYPE DEVICE

FIELD OF THE INVENTION

The present invention is related to a folding-length-difference compensatory mechanism for a flexible display device, and more particularly to a folding-length-difference compensatory mechanism for a multi-step foldable device. The multi-step foldable device refers to an electronic device with a flexible display, which includes at least three bodies and at least two hinge modules, and each hinge module is arranged between each two bodies such that the electronic device can be folded at least twice. In other words, the electronic device as a whole can also be folded at least twice, instead of being folded only once.

BACKGROUND OF THE INVENTION

Generally, a multi-step foldable electronic device mainly provides multiple display screens or a single integrated large-sized display screen, which can display diverse and rich content, and is better than a single display screen in a conventional electronic device. Multi-step foldable electronic devices in prior art, for example, include the US patent "Personal digital assistant, and display control method and display control program thereof" with patent number U.S. Pat. No. 8,928,552 B and application Ser. No. 13/180,795, referred to as Citation 1 below. Citation 1 discloses a personal digital assistant (referred to as PDA) including first, second, and third casings and first and second connecting portions. However, the PDA is equipped with a conventional display, so that it is relatively thick when the whole structure is folded and thus is not easy to be thinner.

A flexible display is developed and configured in a multi-step foldable electronic device. For example, U.S. Pat. No. "A portable communication device having flexible display unit" with application number U.S. Ser. No. 13/447,739/and patent number U.S. Pat. No. 9,071,673 B, referred to Citation 2 below. As shown in Citation 2, a flexible display unit is arranged on the same sides of the first, second, and third bases and first and second hinge modules. Because the portable communication device is a multi-step foldable electronic device with double inward folding, when the whole structure is folded, the second housing will be stacked between the first housing and third housing, and a first curvature space portion will be formed between the first and second hinges, and a second curvature space portion will be formed between the first base and third housings and the second hinge module. Such arrangements, together with the first and second variable movement portions, make it possible for the two curved portions formed by the folded flexible display unit to be placed in the two curvature space portions respectively. In other words, the thinner flexible display unit in Citation 2 is advantage over conventional displays, so as to reduce the overall folded thickness. For other Chinese patents, such as CN105788452A with application number CN201510940306.X, CN105788458A with application number CN201410817020.8, CN105339887B with application number CN201480037540.5 (referred to Citation 3 below), multi-fold electronic devices are provided with flexible displays and perform a three-step folding pattern that is approximately 6-shaped or G-shaped in a form of double inward folding.

Moreover, Citation 3 also adds a three-step folding pattern that presents an approximately S-shape or Z-shape in an inward folding way together with an outward folding. Of course, being advantage in the use of the flexible display part (that is, the flexible screen), the whole device in Citation 3 in the folded state is thinner than that in Citation 1. However, the two links used as a shaft are not clearly disclosed, but it is only described briefly. Therefore, it is doubtful whether it can form a fully closing state after being folded. Please refer to following patent "a spindle module of a folding device" with application number TW 107113396/CN 201810371007.2 (referred to Citation 4) filed by Applicant of the present invention. In this patent, in terms of multi-axis shafts, because it is required to remain sufficient distance for the four shafts to install other components, a gap will be formed between the second support member and the third support member connected by the multi-axis rotating shaft after the whole structure of Citation 4 is folded. Therefore, when the flexible display is provided on the same sides of the three support members, the split-type rotating shaft and the multi-axis rotating shaft, the existence of the gap mentioned above will affect the overall thickness. In other words, the same technical problem is still left for the two connecting parts that belongs to the multi-axis rotating shaft.

Because the hinge modules disclosed in Citation 2 and other Citations have different spread of axles between their respective dual-axis, they also affect the curvature and dimensional distance of the two curved parts of the flexible display unit, resulting in that the two curved portions of the flexible display unit need to be folded in sequence during the process of double inward folding. In comparison with the structure of Citation 2, the structures in Citations 1, 3, and 4 with an inward folding together with an outward folding are more convenient to be unfolded. Moreover, this folding pattern has been developed since Citation 1 with a conventional display is disclosed, and continues to be developed until Citation 3 with the flexible display is filed, and continues to be developed until the structural design of Citation 4 is disclosed. Therefore, such develop pattern is the main pattern of this kind of technical scheme. As for the usage of double inward folding or double outward folding to fold the three bases into two layers, it is also a developing type that can be considered. Therefore, in order to maintain the advantages in being thinner, further optimize the technical scheme of Citation 4 and provide a structural solution that differs from Citation 4, in addition to improving the technical problem in Citation 4 and enabling the two support members to be overlapped with each other, so as to make the curvature of the flexible display difficult to be expanded when the flexible display is folded, there is a need to produce the effect of compensating the length difference resulted from the folding, so that the influence of the length difference of the flexible display when the flexible display is folded or unfolded can be reduced. In view of this, in order to provide a structure different from prior art and to improve the above disadvantages, the inventor has continuously researched to develop the present invention.

SUMMARY OF THE INVENTION

An object of the present invention is to provide a folding-length-difference compensatory mechanism for the multi-step foldable device. During the folding process, a pivoting operation without a shaft is produced by the length difference compensation produced by the connection and structural characteristics of main linkage members, sub-linkage members, sliding members and intermediate transmission members of each sliding unit, together with the housing guiding structure formed at the end and the lateral edge between the two housings of housing seats that are connected with each other, and together with the connection and structural features between the curved-shaped feet of the support plate and the curved-shaped guiding groove of the sliding member. Such arrangement can effectively reduce the overall thickness and simplify its components, so as to reduce productive costs, and can also maintain the stability of the transmission during folding or unfolding process. Moreover, when the multi-foldable type device is folded, the two curved parts of the flexible display have a small curvature, and when the multi-foldable type device is unfolded, the folding length difference compensatory mechanism can provide a stable support to the unfolded flexible display.

In order to fulfill above objects, the present invention provides a folding-length-difference compensatory mechanism for the multi-step foldable device having three embodiments. The first embodiment of the present invention comprises: a first base, a first hinge module, a second base, a second hinge module and a third base; where the first hinge module is respectively connected with one end of the first base and one end of the third base, and the second hinge module is respectively connected with opposite ends of the second base and the third base, and a flexible display is provided on the same sides of the first hinge module, the second hinge module, the first base, the second base and the third base. The third base and/or the first base or the second base includes a connecting housing and a docking housing that are relatively slidable with each other; the first hinge module including: a first main body, one end of which has a first main pivoting portion and a first sub-pivoting portion that are spaced from each other; and a first sliding unit, including: a first main linkage member, opposite ends of which pivotally connected to the first main pivoting portion and connected to the connecting housing respectively; a first sub-linkage member, having one end pivotally connected to the first sub-pivoting portion, where a pivoting node is formed between two ends of the first sub-linkage member, such that another end of the first sub-linkage member is movable relatively to and limited by the first main linkage member. A first sliding member, one end of which is movable relative to and limited by the connecting housing, where the first sliding member has an opposite end connected with the docking housing; and a first intermediate transmission member, pivotally connected to the connecting housing, wherein the first intermediate transmission member has two ends respectively moveable with another end of the first sub-linkage member and the first sliding member, such that the one end of the first sub-linkage member and the first sliding member are respectively moved in reverse directions, for the first sliding member to drive the docking housing to be movable relative to the connecting housing that is connected with the docking housing.

In order to fulfill above objects, the present invention provides a folding-length-difference compensatory mechanism for the multi-step foldable device having three embodiments. The second embodiment of the present invention comprises: a first base, a first hinge module, a second base, a second hinge module and a third base; where the first hinge module is respectively connected with one end of the first base and one end of the third base, and the second hinge module is respectively connected with opposite ends of the second base and the third base, and a flexible display is provided on the same side of the first hinge module, the second hinge module, the first base, the second base and the third base; wherein the third base and/or the second base or the first base includes a connecting housing and a docking housing that are relatively slidable with each other; the second hinge module including: a second main body, one end of which has a second main pivoting portion and a second sub-pivoting portion and a stopping portion; and a second sliding unit, including: a second main linkage member, opposite ends of which being pivotally connected to the second main pivoting portion and connected to the connecting housing respectively; a second sub-linkage member, having one end pivotally connected to the second sub-pivoting portion, where a pivoting node is formed between two ends of the second sub-linkage member, such that other end of the second sub-linkage member is moveable relatively and limited by the second main linkage member. A second sliding member, one end of which is movable relative to and limited by the connecting housing, where the second sliding member has an opposite end connected with the docking housing, and the second sliding member is further provided with a curved guiding groove; a second intermediate transmission member, pivotally connected to the connecting housing, wherein the second intermediate transmission member has two ends movable respectively with another end of the second sub-linkage member and the second sliding member, such that the one end of the second sub-linkage member and the second sliding member are respectively moved in reverse directions; and a support plate body, one end of which is a corresponding stopping portion for in connection with or in disconnection with the stopping portion, and one side of opposite end of the support plate body is provided with a curved plate foot for guiding the curved guiding groove in a curved sliding way, such that the support plate body is slid by the second sliding member and tilted relative to the second sliding member, for the second sliding member to drive the docking housing to be moveable relative to the connecting housing that is connected with the docking housing.

In order to fulfill above objects, the present invention provides a folding-length-difference compensatory mechanism for the multi-step foldable device having three embodiments. The third embodiment of the present invention comprises: a first base, a first hinge module, a second base, a second hinge module and a third base; where the first hinge module is respectively connected with one end of the first base and one end of the third base, and the second hinge module is respectively connected with opposite ends of the second base and the third base, and a flexible display is provided on the same sides of the first hinge module, the second hinge module, the first base, the second base and the third base; wherein the folding-length-difference compensatory mechanism is characterized in that: the first base and the second base includes a connecting housing and a docking housing that are relatively slidable with each other; the third base includes two connecting housings and a docking housing that is relatively slidable between the two connecting housings. The first hinge module includes a first main body and a first sliding unit of the first embodiment, and further includes a third sliding unit having a structure corresponding to the first sliding unit, and the first and third sliding units are symmetrically provided respectively at both ends of the first main body. A third main pivoting portion and a third sub-pivoting portion that are spaced from each other are further provided at the opposite ends of the first main body, and the third main pivoting portion and the third sub-pivoting portion are respectively with the first main pivoting portion and the first sub-pivoting portion to be provided symmetrically at the opposite end of the first main body respectively; ends of each first main linkage member are pivotally connected to the first and third main pivoting members, respectively, and opposite ends of each first main linkage members are respectively connected to each connection housings; ends of each first sub-linkage members are pivotally connected with the first and third sub-pivoting members, respectively, and opposite ends of each first sliding member are connected with each docking housing respectively, such that when the first base is folded or unfolded relative to the third base, each first sliding member respectively drives one docking housings to be movable relative to the connecting housing that is connected with the docking housing, and the second hinge module includes a second main body and a second sliding unit of the second embodiment, and further includes a fourth sliding unit having a structure corresponding to the second sliding unit, and symmetrically provided at both ends of the second main body. A fourth main pivoting portion, a fourth sub-pivoting portion, and another blocking portion are further provided at the opposite end of the second main body, and the fourth main pivoting portion, the fourth sub-pivoting portion, and another blocking portion are corresponding to the second main pivoting portion, the second sub-pivoting portion, and the blocking portion to be symmetrically provided at opposite ends of the second main body; ends of each second main linkage members are pivotally connected with the second main pivoting portion and the fourth main pivoting portion, and opposite ends of each second main linkage member are respectively connected with one connecting housings, ends of each second sub-linkage member are pivotally connected with the second sub-pivoting portion and the fourth sub-pivoting portion respectively, and opposite ends of each second sliding member are connected with one docking housings respectively, such that when the second base is folded or unfolded relative to the third base, each second sliding member respectively drives one docking housings to be movable relative to the connecting housing that is connected with the docking housing.

The present invention will be understood more fully by reference to the detailed description of the drawings and the preferred embodiments below. In order to deeply understand the present invention, the embodiments of the present invention are described below.

BRIEF DESCRIPTION OF DRAWINGS

FIG. 5-1 is an exploded schematic perspective view of the first hinge module of the present invention.

FIG. 5-2 is an exploded schematic perspective view of the second hinge module of the present invention.

FIG. 17 is a three-dimensional schematic view showing the three housings and two hinge modules of FIG. 1 in a unfolded state (in order to show the inward part and the outward part in an unfolded state, where the flexible display in FIG. 17 is indicated by virtual lines).

DETAILED DESCRIPTIONS OF PREFERRED EMBODIMENTS

Figure 24:
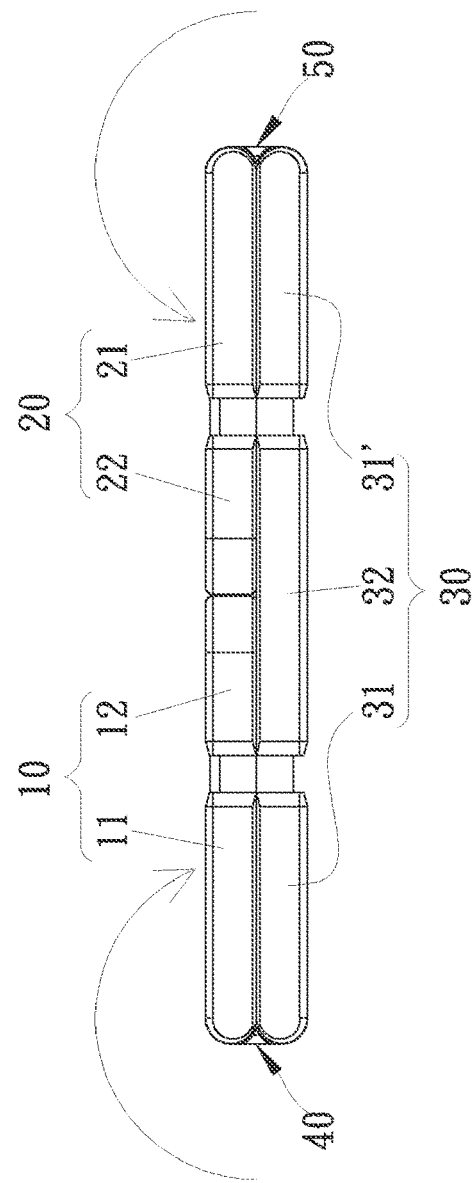
Figure 25:
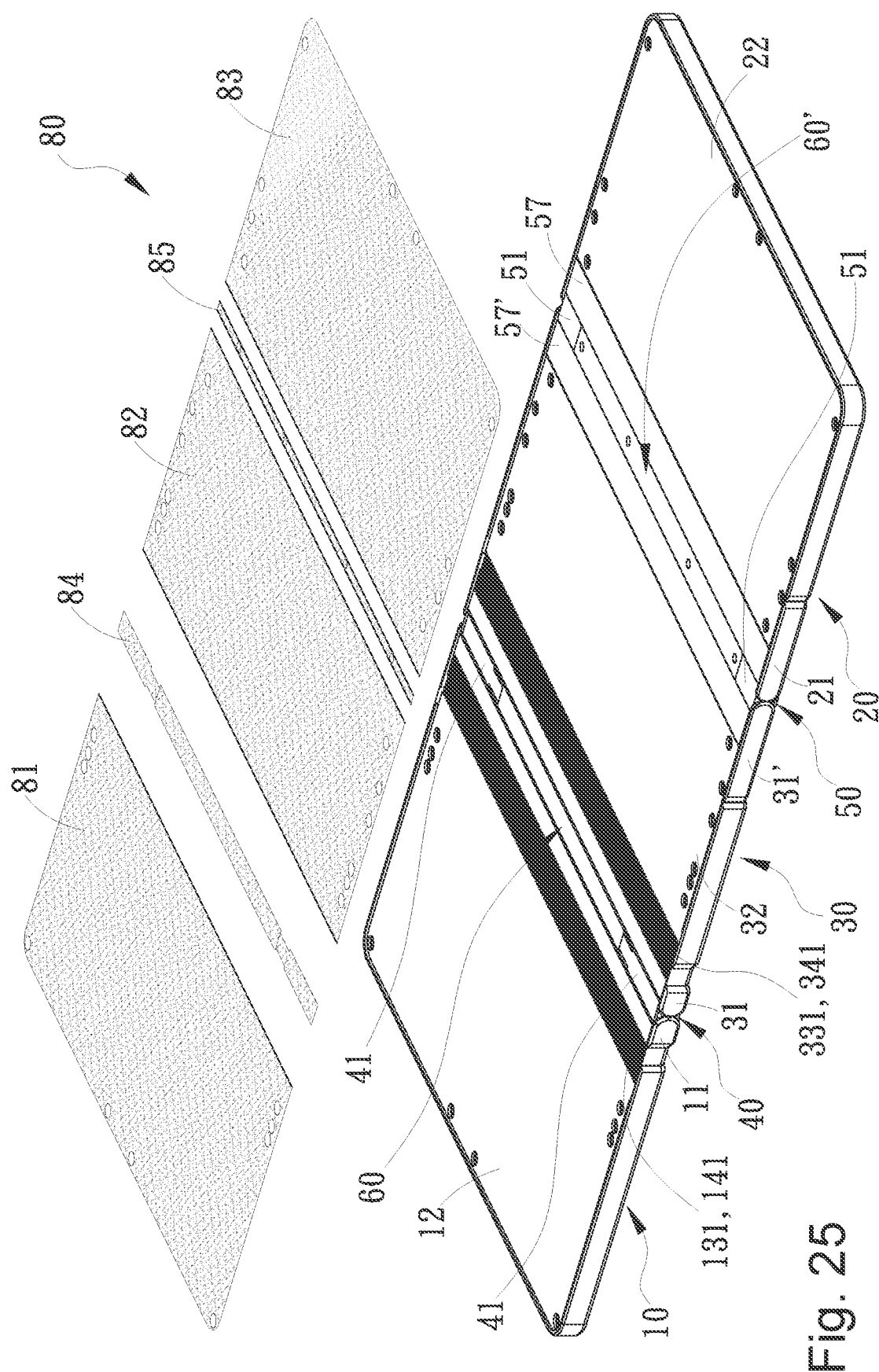
FIG. 25 and FIG. 26 are schematic perspective views showing the adhesive layer of the present invention when being coated or not.
Figure 26:
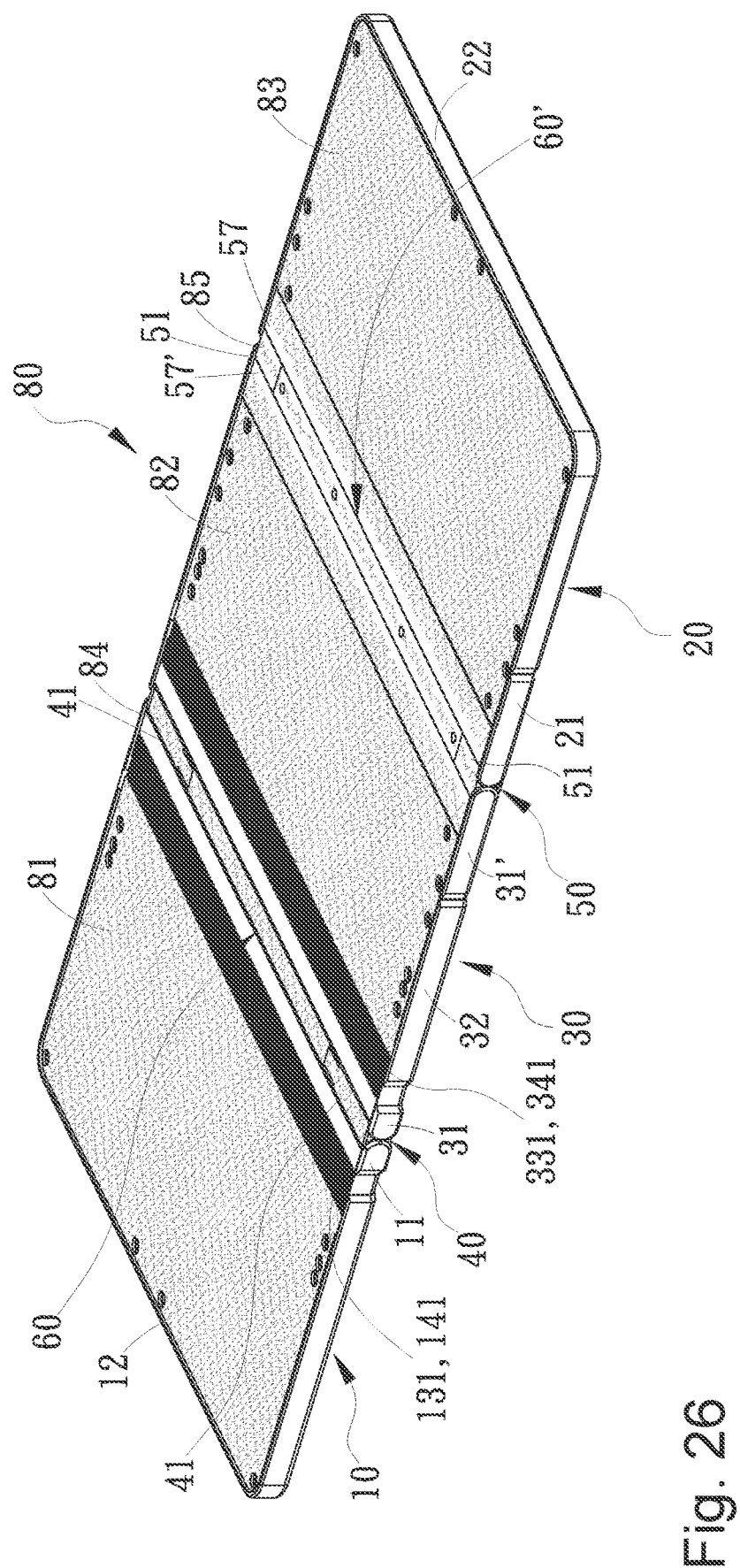

Referring to FIGS. 1 to 26, which show a folding-length-difference compensatory mechanism for a multi-step foldable device. The complete folded state is shown in a way of being inwardly folded together with being outwardly folded as shown in FIG. 1 to FIG. 7. The outward-folded part in the unfolded state is shown in FIG. 8 to FIG. 12. The inward-folded part in the unfold state is shown in FIG. 13 to FIG. 16. The entire structure of the folding-length-difference compensatory mechanism in the unfolded state is shown in FIG. 17 to FIG. 20. The embodiment of being double-outward-folded in an unfolded state or a folded state is show in FIG. 23 and FIG. 24. Before and after the adhesive layer is laid on the folding-length-difference compensatory mechanism are shown in FIG. 25 and FIG. 26 respectively. As shown in FIG. 27 to FIG. 34, each of the four operation areas of the sliding unit of the present invention is an embodiment in which a protruding pillar are used with a long guiding hole in pairs, and a rack is used with a toothed structure in pairs as followed by a detailed description of each embodiment.

The folding-length-difference compensatory mechanism 1 of the present invention comprises a first base 10, a first hinge module 40, a second base 20, a second hinge module 50, and a third base 30. A hinge module 40 is respectively connected with one ends of the first base 10 and the third base 30, and a second hinge module 50 is respectively connected with one end of the second base 20 and opposite end of the third base 30. A flexible display 90 is installed on the same sides of these two modules and these three housings, such that the flexible display 90 is turned into a folded or unfolded state with the first base 10 and/or the second base 20 relative to the third base 30. When being folded, the flexible display 90 is to form a first curved portion 91 and a second curved portion 92. The first curved portion 91 is provided along the surface of the first hinge module 40, and the second curved portion 92 is accommodated within an accommodation space S formed between the first and third bases 20 and 30 and the second hinge module 50. The third base 30 and/or the first base 10 or the second base 20 includes connecting housings 11, 21, 31, 31' and docking housings 12, 22, 32 slidable relative to the connecting housings 11, 21, 31, 31'. Each housing further includes a bottom housing and a cover plate covering the bottom housing, so to facilitate manufacturing and assembly. The technical schemes of the folding-length-difference compensatory mechanism of the present invention are described in following three embodiments respectively.

The first embodiment is described with reference to FIGS. 1 to 12. The first hinge module 40 includes a first main body 41 and a first sliding unit 42. One end of the first main body 41 is provided with a first main pivoting portion 411 and a first sub-pivoting portion 412, and the first sliding unit 42 includes a first main linkage member 43, a first sub-linkage part 44, a first sliding member 45 and a first intermediate transmission member 46. One end of the first main linkage member 43, which can form an integrated structure by a first shaft 71 or a second shaft 72 of the at least one first hinge device 701, or can form an integrated structure by being combined with the first shaft 71 or the second shaft 72, is pivotally connected with the first main pivoting portion 411. The opposite end of the first main linkage member 43 is connected with and fixed by the connecting housings 11, 31 of the first base 10 or the third base 30. One end of the first sub-linkage member 44 is pivotally connected with the first sub-pivoting node 412, and a pivot node 441 is formed between both ends of the first sub-linkage 44 to be rotated within a limited space and the other end of the first sub-linkage member 44 is allowed to be movable and limited to the first main linkage member 43 to make a switch between a rotation and a telescopic operations. One end of the first sliding member 45 is movable and limited within the connecting housings 11, 31, and opposite end of the first sliding member 45 is connected with one end of the docking housings 12, 32. The first intermediate transmission member 46 includes a plate body 462 and a pillar 461 as a rotation center of the plate body 462. The first intermediate transmission member 46 is pivotally connected and positioned in the connecting housings 11, 31 by the pillar 461. The first intermediate transmission member 46 has two ends that are movable with another ends of the first linkage member 44 and the first sliding member 45 to be drawn with each other in a thin and limited space, such that another ends of the first sub-linkage member 44 and the first sliding members 45 are moved in reverse directions respectively for the first sliding member 45 to drive the docking housings 12, 32 to be movable relative to the connecting housings 11, 31 that are connected with the docking housings 12, 32. The first base 10 and/or the third base 30 are respectively equipped with two housings that are connected with each other together with the first main body 41 and the at least one first sliding unit 42, so as to generate a telescopic displacement operation to compensate the length difference produced from the first curved portion 91 of the flexible display 90 during the outward folding process.

In the above first embodiment, the thickness of the first base 10 and/or the third base 30 can be reduced. In order to perform the compensation for the folding length difference within the limited space and the thinned housing, the first sliding unit 42 needs to be thinner and stabilize its movement, so that the first sub-linkage member 44 further includes a linkage lever 44a and a linkage plate 44b. One end of the linkage lever 44a is pivotally connected with the first sub-pivoting portion 412 by an integrally-formed shaft. An opposite end of the linkage lever 44a is pivotally connected with one side of the linkage plate 44b to form a pivot node 441. The linkage plate 44b is movable along the connecting housings 11 and 31 of the first base 10 and/or the third base 30. An opposite end of the linkage lever 44a is protruded to form a protruding shaft 442, and the protruding shaft 442 and the pivot node 441 are on the same rotation axis. A lateral wing 443 is also protruded from the side of the linkage plate 44b, such that the lateral wing 443 is parallel to the protruding shaft 442, and the lateral wing 443 and the protruding shaft 442 are movable and limited within an elongated guiding groove 431. An elongated guiding groove 431 is formed between the opposite end of the first main linkage member 43 and a wall surface of the connecting housing 11, 31 (the first base 10 and/or the third base 30). The elongated guiding grooves formed together are used to ensure the structural strength when the thickness of components is reduced. The protruding shaft 442 and the lateral wing 443 are sliable together within the elongated guiding groove 431 to increase the stability and share the overall loading, so as to produce a technical effect of being thinner.

In order to reduce the damage to the flexible display 90 resulting from the outward folding operation, and let the first sliding unit 42 produce an effect of the change of fast and slow motions within a limited sliding displacement range, the connecting housings 11, 31 of the first base 10 and/or the third base 30 also respectively have at least one limiting guiding groove 111, 311 and an in-slot limiting pillar 112, 312 protruded straightly from the at least one limiting guiding groove, such that one end of the first sub-linkage member 44 can be used as the above-mentioned linkage lever 44a, and the another end of the first sub-linkage member 44, which is used as the above-mentioned linkage plate 44b, is movable back and forth within at least one limiting guiding groove 111, 311. The present invention is further provided with a first operation area M1 and a radial guiding hole 444. The another end of the first sliding member 45 is provided with a connecting portion 451 extended into one end of the docking housing 12 and is connected with its covering plate. The displacement range of the radial guiding hole 444 is movably restricted by the in-slot limiting pillars 112 and 312. The end of the first sliding member 45 is also provided with an accommodating slot 454 to receive a restoring member 453 (for example, a compression spring), and one end of the restoring member 453 is pressed against the inner wall of at least one limiting guiding grooves 111 and 311, so as to allow each component to slide into their presetting place to prevent each component from being easily loosening, and reduce the effects caused by the gap during the operation. A lateral wing 452 provided between the two ends of the first sliding member 45 is further provided with a second operation area M2. The first intermediate transmission member 46 is provided with a third operation area M3 and a fourth operation area M4 at both ends of the plate body 462 respectively. The fourth operation area M4 is moved with the second operation area M2, and the third operation area M3 is moved with the first operation area M1, such that the other end of the first sub-linkage member 44 and the first sliding member 45 are synchronously movable with an effect of the change of fast and slow motions in a reverse direction within a limited range respectively.

In order to stabilize the compensation operation, the present invention is provided with a lateral guiding structure and an end guiding structure on the first base 10 and/or the third base 30 respectively, wherein the lateral guiding structure is extended to form at least one lateral guiding rod 113, 313 in a direction from the connecting housing 11, 31 toward the docking housing 12, 32. Corresponding to the docking housing 12, 32, at which at least one notch 121, 321 and at least one positioning pillar 122, 322 are provided for at least one lateral guiding rod 113, 313 to pass through the at least one notch 121, 321 and then continue to pass through the gap between the at least one positioning pillar 122, 322 and the inner wall of the docking housing 12, 325. Through the lateral guiding structure formed by the two bases, at least one lateral guiding rod 113, 313 can be limited to perform a linear sliding displacement, which is used for stabilizing the overall movement when the structure of the present invention compensates the difference of folding length. The opposite surfaces of the first sliding member 45 and the lateral guiding rods 113, 313 are respectively provided with a limiting groove 455 and a rod-side protrusion 114, 314. The rod-side protrusion 114, 314 is restrictively movable within the limiting groove 455 to define the movement range of compensation for folding length difference. On the other hand, the end guiding structure is provided at the connecting end of the two housings of the first base 10 and/or the third base 30, and the connecting housing 11, 31 and the docking housing 12, 32 respectively form a step portion 13, 14, 33, 34 that is correspondingly engageable at their respective end. One step portion 13, 33 is provided with a plurality of long protruding ribs 131, 331 side by side, and the corresponding step portion 14, 34 is provided with a plurality of long strips 141, 341, the long protruding ribs 131, 331 and the long strips 141, 341 that are alternately intertwined and can be guided with each other. The end guiding structure is formed through the docking ends of the two housings of the respective bases, so to increase the stability of the operation when the structure of the present invention compensates the difference for the folding length.

Since the above-mentioned compensation operation is performed on a single base, in order to share the load evenly, the present invention respectively provides at least one sliding unit to the first and third bases 10 and 30, and the adopted technical scheme is that a third main pivoting portion 413 and a third sub-pivoting portion 414 that are spaced from each other and are further provided at opposite ends of the first main body 41, and the third main pivoting portion 413 and the third sub-pivoting portion 414 and the first main pivoting portion 411 and the first sub-pivoting portion 412 are symmetrically provided at opposite ends of the first main body 41. The first hinge module 40 further includes a third sliding unit 42', and the third sliding unit 42' has a structure corresponding to the first sliding unit 42 (where the third sliding unit 42' can be regarded as another first sliding unit 42) and the third sliding unit 42' and the first sliding unit 42 are symmetrically provided at two ends of the first main body 41. The first sliding unit 42 is connected with the first base 10, and the third sliding unit 42' is connected with the third base 30, such that the first and third sliding units 42, 42' produce compensation operations for the difference in folding length in the first and third bases 10, 30 respectively, and the lateral guiding structure and end guiding structure are used for stabilizing overall operation, which is helpful to form a small curvature when the outer folded portion (the first bending portion 91) of the flexible display 90 is folded.

A first extension base 60 and at least one first hinge 701 received in the first extension base 60 are further provided between the first base 10 and the third base 30, and a limiting groove 62 is formed respectively on the opposite ends of one axial side of the first extension base 60, and one protruding block 432 is further provided on an axial lateral wall surface corresponding to an end portion of one first main linkage member, which belongs to the first sliding unit 42 and the third sliding unit 42'. Each protruding block 432 is restrictively movable within one limiting groove 62, such that the rotation range of each first main linkage member 43 is limited between the wall surfaces of one limiting groove 62 to define the respective rotational range of each seat in a folding state. The end of each first main linkage member 43 is axially extended to form a cover 434, 534 to protect the end of one first sub-linkage member 44 and prevent foreign substances from be entered, and oil can be stored in the cover for lubrication. The first main body 41 is provided with an axially extending portion 415 to partially shield the end of each first main linkage member 43 and the gaps between each end, such that the ends of the first main body 41, the first extension base 60, and each first main linkage member 43 form a complete outline on the same side, so as to support, fit with the first curved portion 91 of the flexible display 90 and to improve the overall appearance. At least one first hinge 701 includes two mandrels (a first shaft 71 and a second shaft 72), each of which is passed through one limiting groove 62 and is connected with the first main linkage member 43 of the third sliding unit 42' and the end of the first main linkage member 43 of the first sliding unit 42, such that the first shaft 71 and the second shaft 72 of the at least one first hinge 701 are connected with a main pivoting portion 411 and a third main pivoting portion 413 of the first main body 41 respectively. As a result, the first and third main pivoting portions 411, 413 are used as the main rotation center of the first hinge module 40 respectively. The first and third sub-pivoting portions 412 and 414 are eccentrically provided around the two main rotation centers respectively, so as to generate a difference in length during the rotation process from an outwardly folding state to an entirely unfolding state.

Figure 21:
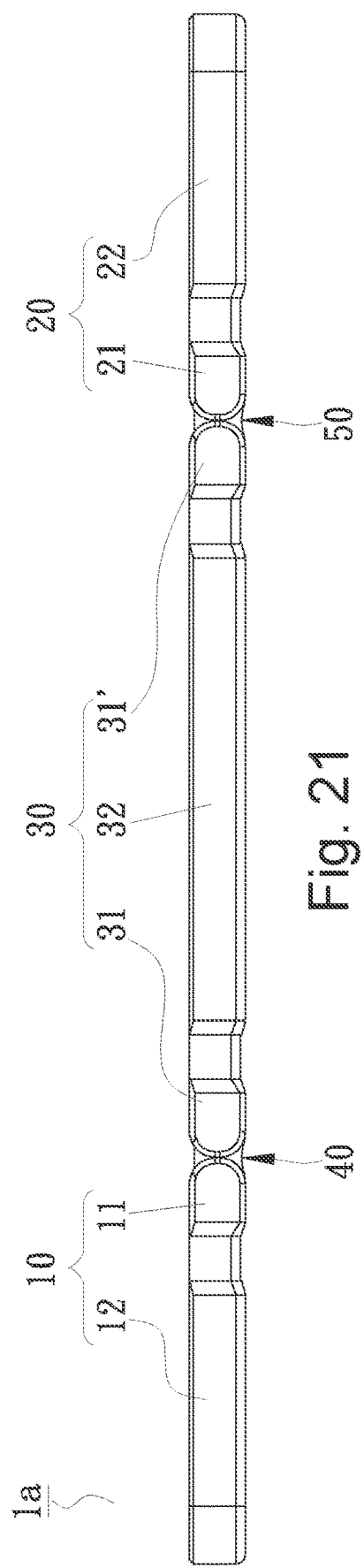
FIG. 21 and FIG. 22 are schematic lateral views of the multi-step foldable device of the present invention of a "double-outwardly folding type" in a folded and unfolded state respectively.
Figure 22:
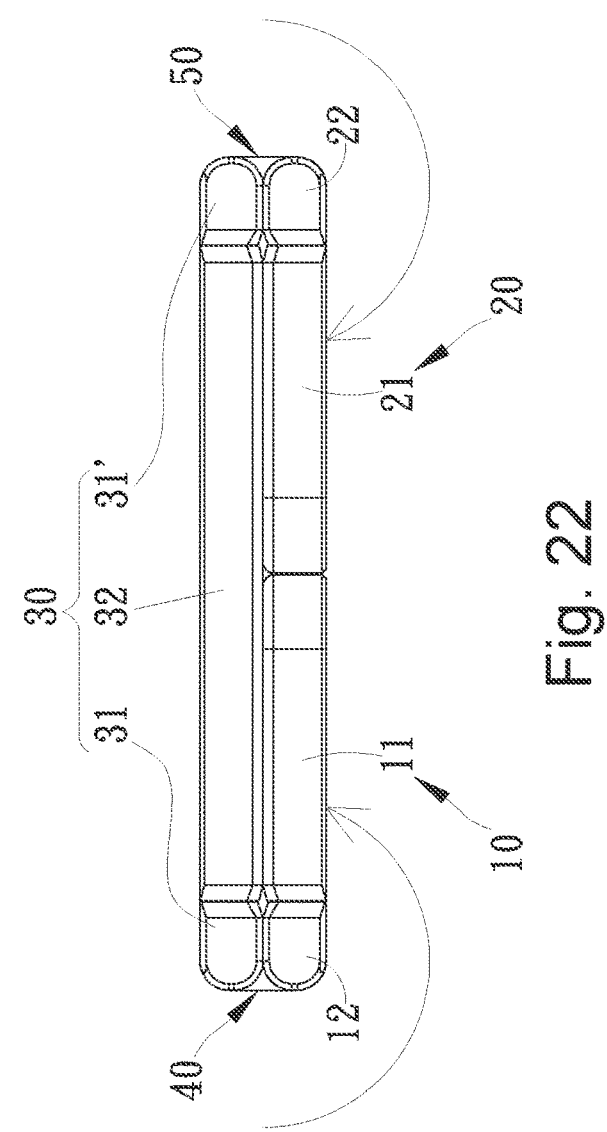

After the first and third bases 10, 30 are rotated reversely through the first hinge module 40, the first curved portion 91 of the flexible display 90 will be folded outwardly to form a small curvature, and the second curved portion 92 between the second and third bases 20, 30 is unable to be inwardly or outwardly folded. When the second bending portion 92 is presented in an inwardly folding way, that is, as disclosed in the subsequent third embodiment of the present invention, details are not described here. When the second curved portion 92 is presented in an outwardly folded way, the first hinge module 40 can be arranged between the second and third bases 20, 30. Such arrangement has the same technical effect. Therefore, the technical scheme of the first embodiment of the present invention can also be applied in a multi-step foldable device with a duel-outwardly folding. As shown in FIG. 21 and FIG. 22, the first hinge module 40 of the present invention is installed between the first base 10 and the third base 30 and between the second base 20 and the third base 30, and thus the difference in folding length during the folding process is compensated through at least one sliding unit arranged in each base, and the two housings of each base are telescopically slid, such that the three bases are relatively rotated and then overlapped to form two layers, so as to produce the technical effect of compensation for the difference in fold length in a duel-outwardly folding way.

The second embodiment of the present invention will be described with reference to FIGS. 1 to 3, 7, and 13 to 16. It is characterized in that the second hinge module 50 includes a second main body 51 and a second sliding unit 52, and one end of the second main body 51 has a second main pivoting portion 511, a second sub-pivoting portion 512, and a blocking portion 515. The second sliding unit 52 includes a second main linkage member 53, a second sub-linkage member 54, a second sliding member 55, a second intermediate transmission member 56, and a support plate 57. In this embodiment, one end of the second main linkage member 53 can be pivotally connected with the second main pivoting portion 511 through an integrated structure in a way of being combined with a first shaft 71 or a second shaft 72 of at least a second hinge 702, or the first shaft 71 or the second shaft 72. One end of the second main linkage member 53, and the opposite end portion of the second main linkage member 511 is connected with and fixed to the connection housing 21 of the second base 20 or the other connection housing 31' of the third base 30. One end of the second sub-linkage member 54 is pivotally connected to the second sub-pivoting portion 512, and a pivoting node 541 is formed between two ends of the second sub-linkage member 54 to promote movement within a limited space and allow the other ends of the second sub-linkage member 54 to be movable and is limited by the second main linkage member 53 to be switched between the turning operation and the telescopic operation. One end of the second sliding member 55 is relatively movable and is limited by the connecting housings 21 and 31'. The opposite ends of the second sliding member 55 are connected to the docking housing 22 and 32, that is, one end of the docking housing 22 of the second base 20 and the opposite end of the shell 32 of the third base 30). The second sliding member 55 is provided with a curved guiding groove 556. The second intermediate transmission member 56 includes a plate body 562 and a pillar 561 used as a rotation center of the plate body 562. The second intermediate transmission member 56 is pivotally connected by the pillar 561 and positioned in the connection housing 21, 31'. The second intermediate transmission member 56 has two ends that are movable with the other end of the second sub-linkage member 54 and the second sliding member 55 respectively, so as to pull each other within a thinner and limited space, such that the other end of the second sub-linkage member 54 and the second sliding members 55 are respectively moved in a reversed direction. It is distinguished from the first embodiment is that one end of the support plate body 57 is corresponding to the block portion 571 for being in connection with or in disconnection with the stop portion 515, and an curved plate leg 572 is provided on the side of opposite end of the support plate 57 for guiding the curved guiding groove 556 in a curvedly sliding manner, which is beneficial for the support plate 57 to be slid by the second sliding member 55 and can be moved relative to second sliding member 55 within the limited space of the thinner housing, so as to form an accommodating space S, such that the second sliding member 55 drives the docking housings 22 and 32 to move relative to the connecting housings 21 and 31' that are connected with the docking housings 22 and 32. The second base 20 and/or the third base 30 having two housings that are connected to each other, together with the second base 51 and at least one second sliding unit 52, can produce a telescoping movement with a speed change and form an accommodating space to accommodate the second curved portion 92 of the flexible display 90 and compensate for the length difference during the inwardly folding process.

In the second embodiment, in order to allow the second sliding unit 52 to stably perform a compensating operation for a difference in folding length within a limited space of the thinner housing, the thickness of the second base 20 and/or the third base 30 can be reduced. The second sub-linkage member 54 further includes a linkage bar 54a and a linkage plate 54b. One end of the linkage bar 54a is pivotally connected with the second sub-pivoting portion 512 by using an integrally formed shaft, and the opposite end of the linkage bar 54a is pivotally connected on one side of the linkage plate 54b to form a pivoting node 541. The linkage plate 54b is moveable along the connecting housing 21, 31' of the second base 20 and/or the third base 30. The opposite end of the linkage bar 54a is also protruded out to form a protruding shaft 542, and the protruding shaft 542 and the pivoting node 541 are located on the same rotation axis, and one side of the linkage plate 54b is also protruded to form a lateral wing 543, such that the lateral wing 543 is parallel to the protruding shaft 542, and the lateral wing 543 and the protruding shaft 542 are moveable restrictively within a long guiding groove 531. An long guiding groove 531 is formed between the opposite end of the second main linkage member 53 and the wall surface of the connection housing 21, 31' (the second seat 20 and/or the third seat 30), so as to use the jointly formed long guiding groove 531 to maintain the structural strength when the thickness of the component is reduced, and the protruding shaft 542 and the sheet 543 are slidable within the long guiding groove 531, which improves stability and shares the load, and thus the effect of being thinner can be achieved.

In order to reduce the damage resulting from the inwardly folding process to the flexible display 90, the second sliding unit 52 is provided to produce an effect of the change of fast and slow motions within a limited sliding displacement range, and the connecting housings 21, 31' of the second base 20 and/or the third base 30 also have at least one limiting guiding groove 211, 311 and an in-slot limiting pillar 212, 312 protruded vertically from the at least one limiting guiding groove 211, 311, such that the other end portion of the sub-second linkage member 54 can be used as the linkage plate 54b and slidable back and forth within at least one of the limiting guiding groove 211, 311. The other end of the second sub-linkage member 54 is further provided with a first operation area M1, and a second operation area M2 and a radial guiding hole 557 are provided on a lateral wing 552 provided between the two ends of the second sliding member 55, and the other end of the second sliding member 55 is provided with a connecting portion 551 extended into one end of the docking housing 22 and connected with the cover plate thereof. The radial guiding hole 557 is movably restricted by the in-slot limiting pillar 212, 312. The second intermediate transmission member 56 is provided with a third operation area M3 and a fourth operation area M4 at both ends of the plate body 562 of the second intermediate transmission member 56 respectively. The fourth operation area M4 is moved with the second operation area M2, and the third operation area M3 is moved with the first operation area M1, such that the other end of the second sub-linkage member 54 and the second sliding member 55 are synchronously in reverse directions to produce the effect of the change of fast and slow motions within a limited range.

In order to enable the support plate body 57 of the second embodiment of the present invention to synchronize with the change of the fast and slow motions, and to ensure the stability and the fulfill of the compensation, in addition to the curved leg 572 together with the curved guiding groove 556 for stabilizing sliding movement, a guiding surface 213, 315 is provided at the end of the connection housings 21, 31' of the second base 20 and/or the third base 30 respectively, and the end of the second sliding member 55 is provided with an inclined surface 555, and the curved guiding groove 556 is recessed inwardly from one lateral side of the second sliding member 55 and penetrates through the inclined surface 555. The other side of the second sliding member 55 is also recessed to form an accommodating slot 554 for being in communication with the curved guiding groove 556 and accommodating a restoring member 553 (such as a tension spring). The curved leg 572 may be integrally formed or detachably connected with one side of the support plate 57 and be guided into the curved guiding groove 556. A stopping ear piece 573 is protruded from one side of the curved leg 572 and is guided into the accommodation groove 554, such that both ends of the restoring member 553 are respectively connected with the stopping ear piece 573 of the curved leg 572 and the in-slot lateral wall of the accommodation groove 554 of the second sliding member 55. A guiding surface 534 and a supporting surface 535 are further formed on one side of the second main linkage member 53. The guiding surface 534 is adjacent to the end of the second main linkage member 53, such that the supporting surface 535 is abut to the guiding surface 534 to from an angle therebetween each other, such that during the swinging and offsetting process of the supporting plate body 57, the corresponding stopping portion 571 is abutted with each guiding surface 213, 315, 534, the supporting surface 535 and the inclined surface 555. That is, after the docking housing 22, 32 is driven and moved to the second main body 51, the corresponding stopping portion 571 of the offset supporting plate 57 is connected with the stopping portion 515 of the second main body 51 to restrict the swinging of the supporting plate 57, such that the second main body 51, the supporting plate body 57 and the docking housing 22, 32 are aligned with each other on the same side. As a result, the second curved portion 92 is unfolded. Conversely, when the docking housings 22 and 32 are driven and moved in a reverse direction, the corresponding stopping portion 571 is moved away from the stopping portion 515. During the reverse swing motion and offset motion of the supporting plate 57 by the elastic restoring force from the resetting member 553, multiple guiding surfaces are used to share the load and to support the supporting plate body 57 uniformly, and then the load is shared and supported uniformly through the supporting surface 535 and the inclined surface 555 to uniformly support the supporting plate body 57, such that the formed accommodating space S is accommodated in the second curved portion 92.

In the second embodiment, in order to share the load evenly and avoid the compensation operation concentrated on a single base, at least one sliding unit of the present invention is also provided in the second and third bases 20 and 30. The technical solution in this embodiment is that there are a fourth main pivoting portion 513, a fourth sub-pivoting portion 514, and another stopping portion 516 at the opposite end of the second main body 51. The three ones, that is, fourth main pivoting portion 513, the fourth sub-pivoting portion 514, and another stopping portion 516 are provided symmetrically with other three ones, that is, the second main pivoting portion 511, a second sub-pivoting portions 512 and the stopping portion 515 at opposite ends of the second main body 51. The second hinge module 50 further includes a fourth sliding unit 52', and the fourth sliding unit 52' has a structure corresponding to the second sliding unit 52, where the fourth sliding unit 52' can be regarded as another second sliding unit 52, and the fourth sliding unit 52' and the second sliding unit 52 are symmetrically provided at both ends of the second main body 51, such that the accommodation space S is symmetrically formed between the second and third bases 20, 30 and the second rotating hinge module 50. The second sliding unit 52 is connected with the second base 20, and the fourth sliding unit 52' is connected with the third base 30, such that the second and fourth sliding units 52 and 52' of the second hinge module 50 preform compensation operations for the difference in folding process in the second and third bases 20 and 30 respectively. As a result, the accommodation space S can be quickly presented and absent, and the inward folding portion of the flexible display 90 (the second curved portion 92) is formed with a small curvature.

A second extension main body 60' and at least one second hinge 702 accommodated in the second extension main body 60' are further provided between the second base 20 and the third base 30. A limiting groove 62 is formed on opposite ends of an axial side of the second extension main body 60', and a wall surface of the axial side corresponding to an end of each second main linkage member 53 is further provided with a protrusion 532. Each protrusion 532 is movably restricted in each limiting groove 62, such that the rotation range of each second main linkage member 53 is limited between the opposite two groove wall surfaces of each limiting groove 62 to define the relative rotational range of each base. At least one second hinge 702 includes two spindles (a first shaft 71 and a second shaft 72), which are respectively passed through each limiting groove 62, and are axially connected with the ends of the second main linkage member 53 of the fourth sliding unit 52' and the second sliding unit 52 respectively, such that the first shaft 71 and the second shaft 72 of the at least one second hinge 702 are connected axially to the second main pivoting portion 511 and the fourth main pivoting portion 513 of the second main body. As a result, the second and fourth main pivoting portions 511, 513 are respectively used as the main rotation center of the second hinge module 50. The second and fourth sub-pivoting portions 512 and 514 are eccentrically provided around these two main rotation centers respectively, such that the length difference is produced during the processes of folding and unfolding from the inward folding state to the unfolding state.

Figure 23:
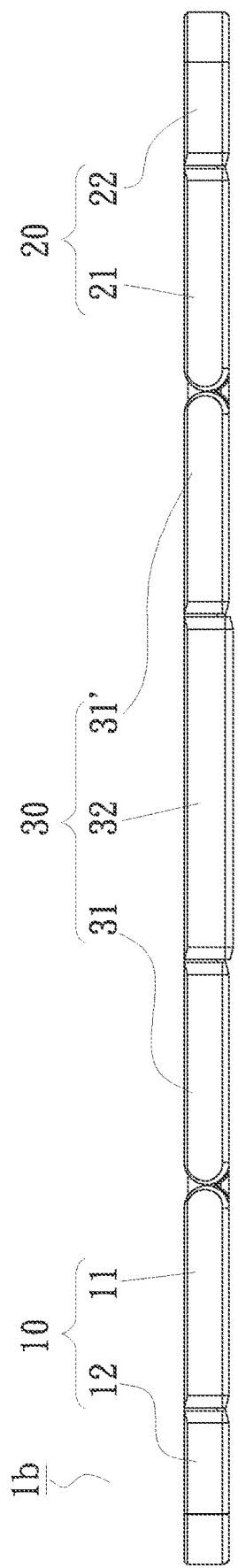
FIG. 23 and FIG. 24 are schematic lateral views of the multi-step foldable device of the present invention of a "double-outwardly folding type" in a folded and unfolded state respectively.

After the second and third bases 20 and 30 are turned through the second hinge module 50, the second curved portion 92 of the flexible display 90 is folded inwardly to be with a small curvature, and the corresponding first curved portion 91 between the first and third bases 10 and 30 is not limited to present in an inward or outward folding. The first curved portion 91 presented in an outwardly folding will be shown in the subsequent third embodiment and will not be described here. When the first curved portion 91 is presented in an inward folding, the second hinge module 50 can be provided between the first and third bases 10 and 30, and produces the same technical effect. Therefore, the technical scheme in the second embodiment can also be used for a multi-step foldable device of double-inward folding as shown in FIGS. 23 and 24. The second hinge module 50 of the present invention is provided between the first base 10 and the third base 30, and between the second base 20 and the third base 30. The second shaft module 50 of the present invention is respectively installed between the first base 10 and the third base 30 and between the second base 20 and the third base 30. A compensation operation for a difference in folding length with effect of the change of fast and slow motions is formed during the folding process through the at least one sliding unit arranged in each base, which cause the housing of each base to telescopically slide, and thus these three bases are folded to form two layers after these three bases are rotated with each other, so as to produce an technical effect of compensation for folding length difference in a double inward folding.

Referring to FIG. 1 to FIG. 20, the third embodiment is a technical solution combining the above first embodiment with the second embodiment. In the third embodiment, the first hinge module 40 in the first embodiment is connected with ends of the first base 10 and the third base 30 respectively, and the second hinge module 50 of the second embodiment is connected with the opposite ends of the second base 20 and the third base 30 respectively, and the third base 30 includes two connection housings 31, 31' and docking housing 32 that can be slid between the two connection housings 31, 31'. The ends of each first main linkage member 43 of the first and third sliding units 42 and 42' are pivotally connected with the first and third main pivoting portions 411 and 413 respectively. The opposite ends of each first main linkage member 43 are respectively connected with the connection housings (the connecting housing 11 of the first base 10 and a connecting housing 31 of the third base 30), and the ends of sub-linkage member 44 of the first and third sliding units 42, 42' are respectively pivotally connected with the first sub-pivoting portion 412 and the third sub-pivoting portion 414, and the opposite ends of each first sliding member 45 of the first and third sliding units 42, 42' are respectively connected with each docking housing (one end of the docking housing 12 of the first base 10 and the docking housing 32 of the third base 30), such that during the folding or unfolding process where the first base 10 is rotated relative to the third base 30, each first sliding member 45 drives one docking housing 12, 32 to be moved relative to the connecting housing 11, 31 that is respectively connected with the docking housing 12, 32. The ends of each second main linkage member 53 of the second and fourth sliding units 52 and 52' are pivotally connected with the second main pivoting portion 511 and the fourth main pivoting portion 513 respectively. The opposite ends of each second main linkage member 53 are respectively connected with one connecting housing (the connecting housing 21 of the second base 20 and another connecting housing 31' of the third base 30), and the ends of each second sub-linkage member 54 of the second and fourth sliding units 52, 52' are pivotally connected with the second sub-pivoting portion 511 and the fourth sub-pivoting portion 513 respectively, and the opposite ends of each second sliding member 55 of the second and fourth sliding units 52, 52' are respectively connected with each docking housings (the opposite ends of the docking housing 22 of the second base 20 and the docking housing 32 of the third base 30), such that during the process where the second base 20 relative to the third base 30 turned into a folded or unfolded state, each second sliding members 55 respectively drives the docking housing 22, 32 and the respective connecting housing 21, 31' to slide. As a result, the folding length difference compensation mechanism is performed by way of outer and inner folding, and these three bases are folded to form three layers after the multi-step foldable device is folded.

In the third embodiment described above, although the first and second hinge modules 40 and 50 are connected through the docking housing 32 of the third base 30, a curved portion of the flexible display 90 (for example, the first curved part 91) is bent, a hinge module (for example, the second hinge module 50) corresponding to another curved part (for example, the second curved portion 92) can be still independently operated with the two bases (for example, the second and third bases 20, 30) so as to produce an effect of the compensation. Since the docking housing 32 of the third base 30 is limited by another hinge module (for example, the first hinge module 40) and thus is to be unmoved, a hinge module (for example, the second hinge module 50) is slidable relative to the docking housing 32. The first and second bases 10 and 20 can also be turned at the same time, such that the two hinge modules perform sliding movements relative to the docking housing 32 of the third base 30.

In these three embodiments, the first main body 41, the second main body 51, the first extension base 60, and the second extension base 60' include a base and a cover covering the base for being used in manufacturing and assembling. Each cover is respectively used to support the flexible display 90, such that a channel 66 is formed between the cover and the base where each base is docked with one base for at least one telecommunication line to pass through it, and the circuit modules in the two bases to which the hinge modules are connected respectively can be electrically connected. At least one mounting slot 61 is recessed in the seat body of the two extension bases for respectively receiving at least one first hinge 701 and at least one second hinge 702. In addition to each limiting groove 62 corresponding to the protruding blocks 432 and 452, two holes 63 are also provided on the axial sides of the two extension base seats.

Holes 433, 533 are further provided on the axial lateral wall surfaces of the ends of each first and second main linkage member 43, 53. A spring 64 and a ball 65 moved with the spring 64 are accommodated in each hole 63. During the relative rotations of an end of each first main linkage member 43 and an axial side of the first extension base 60 and the relative rotations of an end of each second linkage member 53 and an axial side of the second extension base 60', when the balls 65 are respectively positioned in the corresponding holes 433, 533, each base is respectively positioned in the folded or unfolded state to assist the overall support to maintain the unfolded or folded state.

Figure 1:
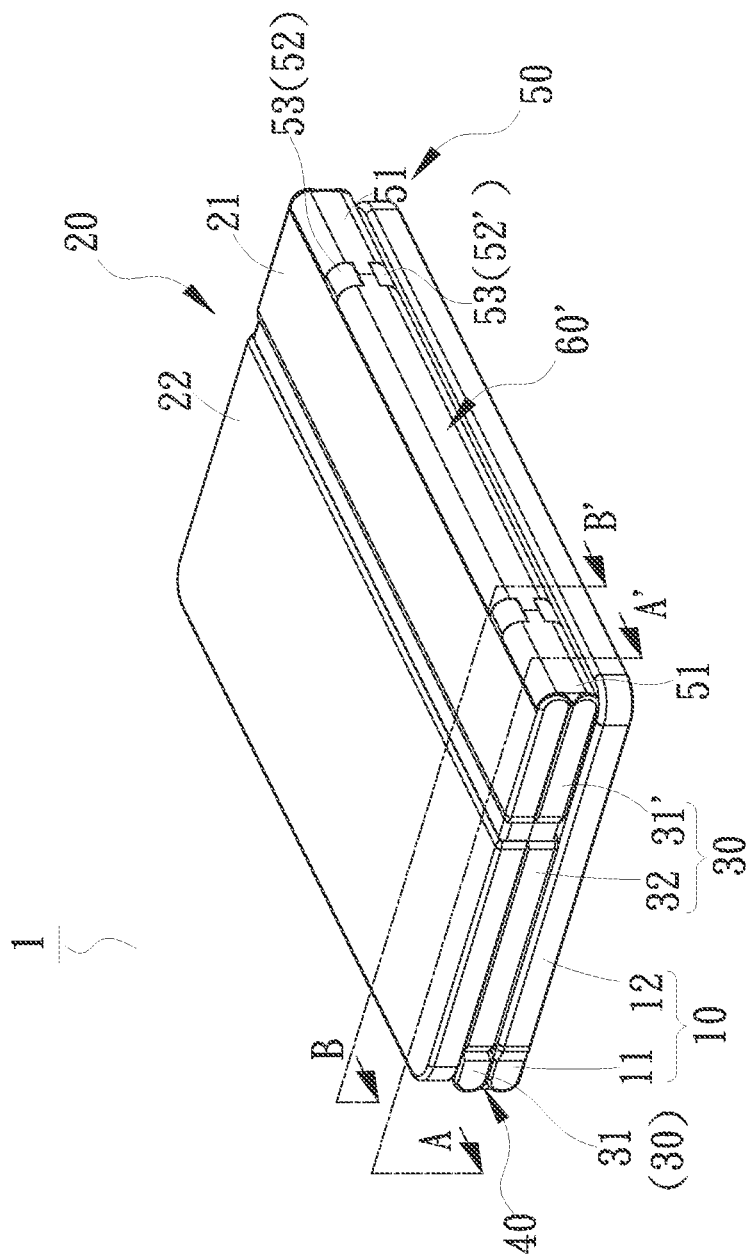
FIG. 1 is a schematic perspective view of the folding-length-difference compensatory mechanism for the multi-step foldable device of the present invention.
Figure 2:
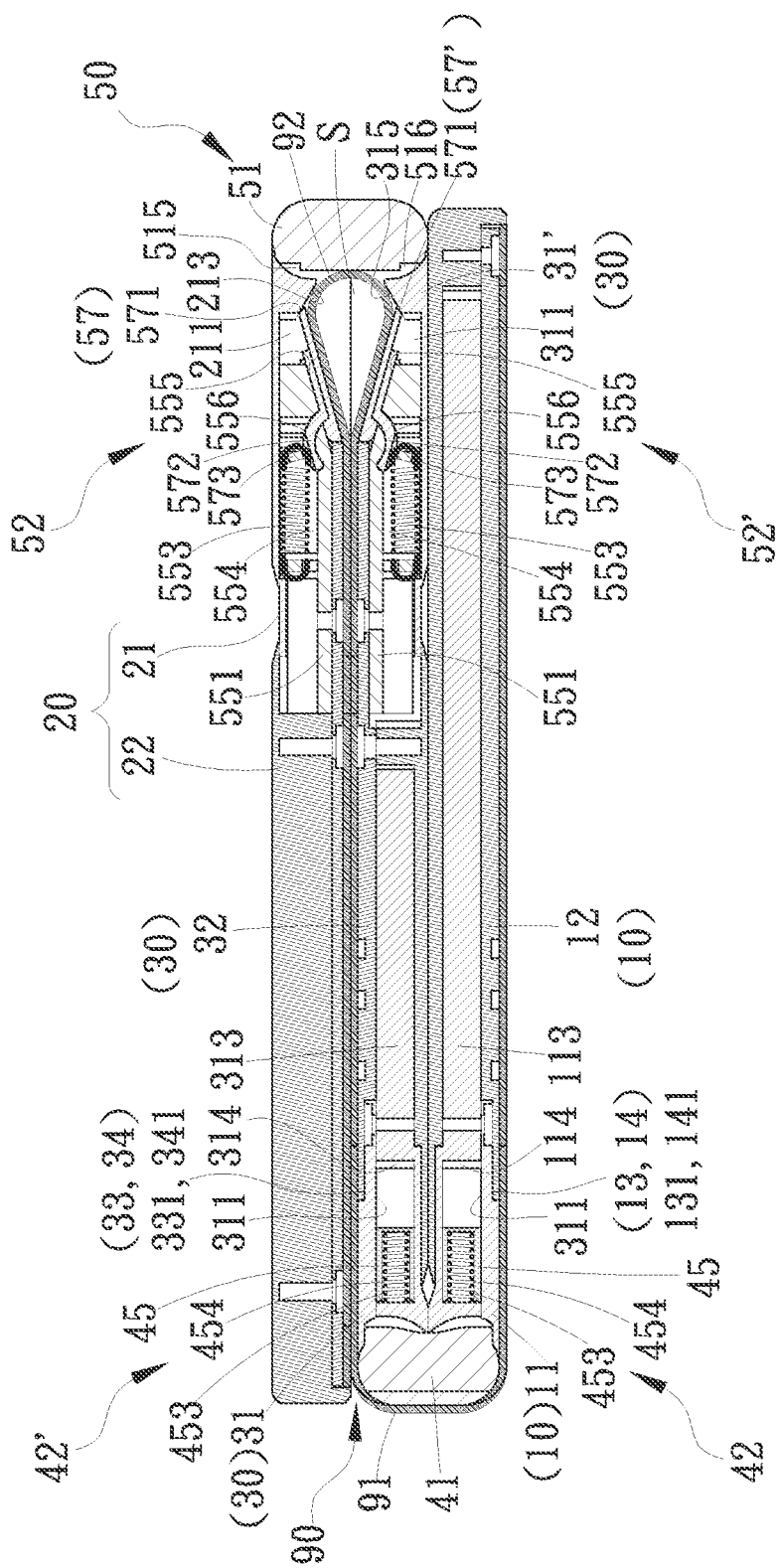
FIG. 2 is a cross-sectional view along a line A to A' of FIG. 1.
Figure 3:
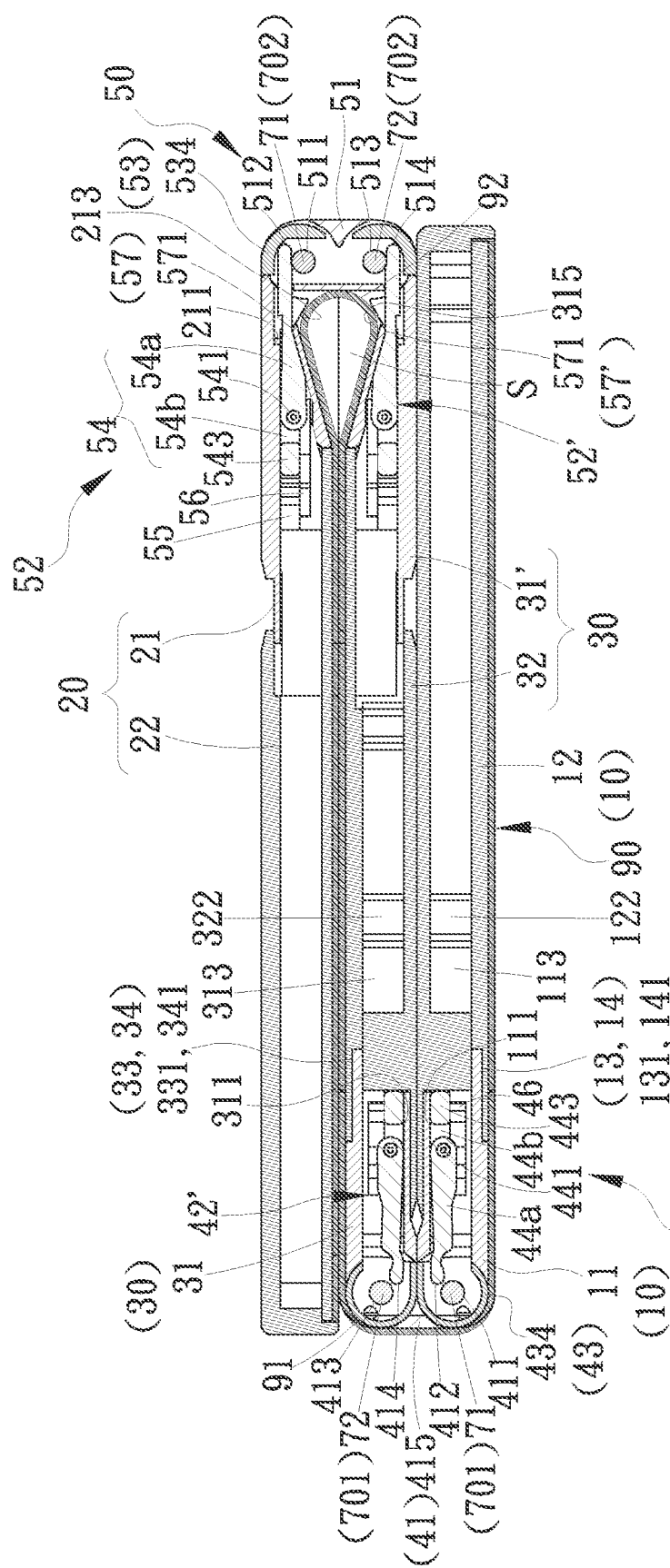
FIG. 3 is a cross-sectional view along a line B to B' of FIG. 1.
Figure 4:
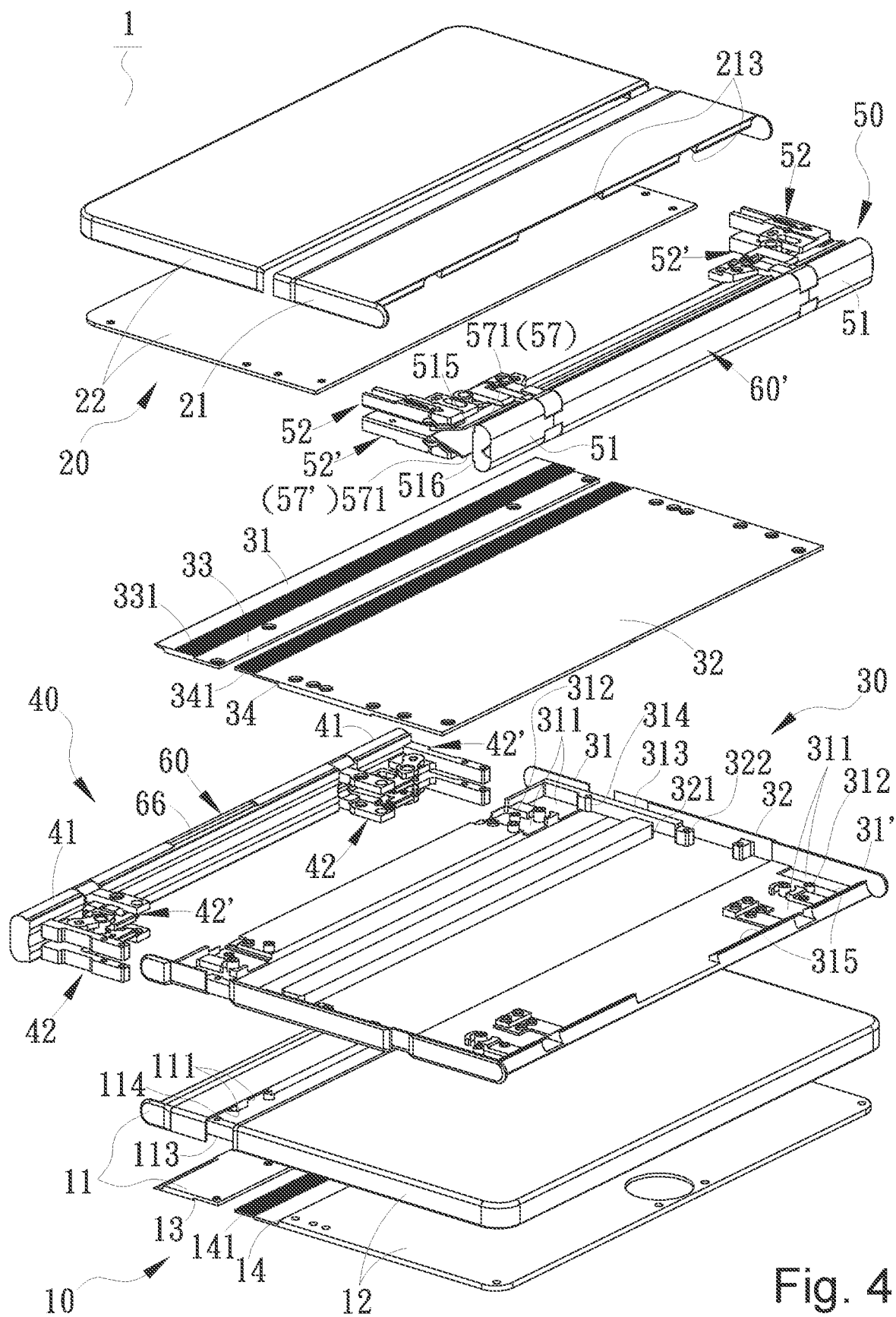
FIG. 4 is an exploded view of the three housing in FIG. 1 separated from the two hinge modules.
Figures 1, 5:
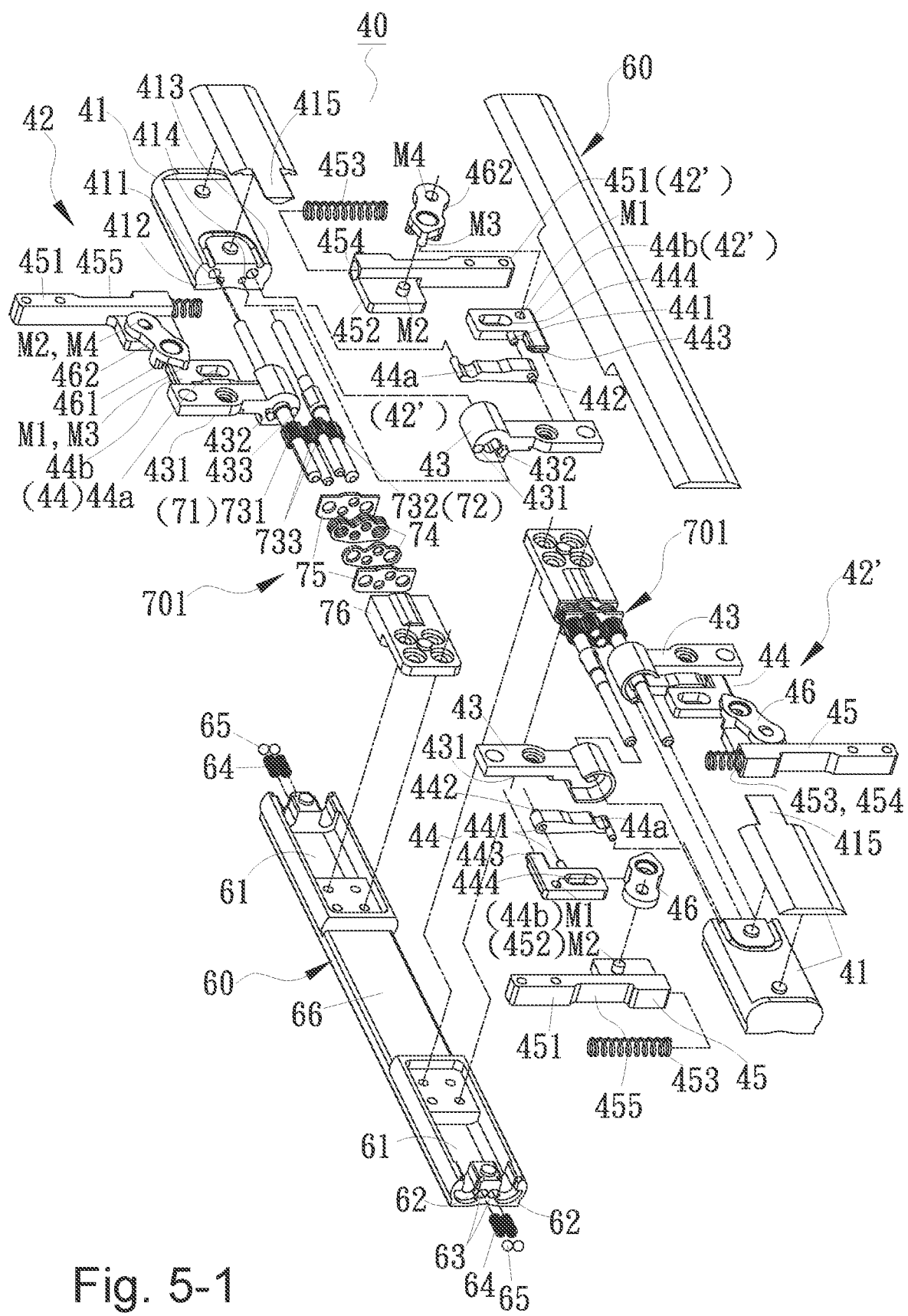
Figures 2, 5:
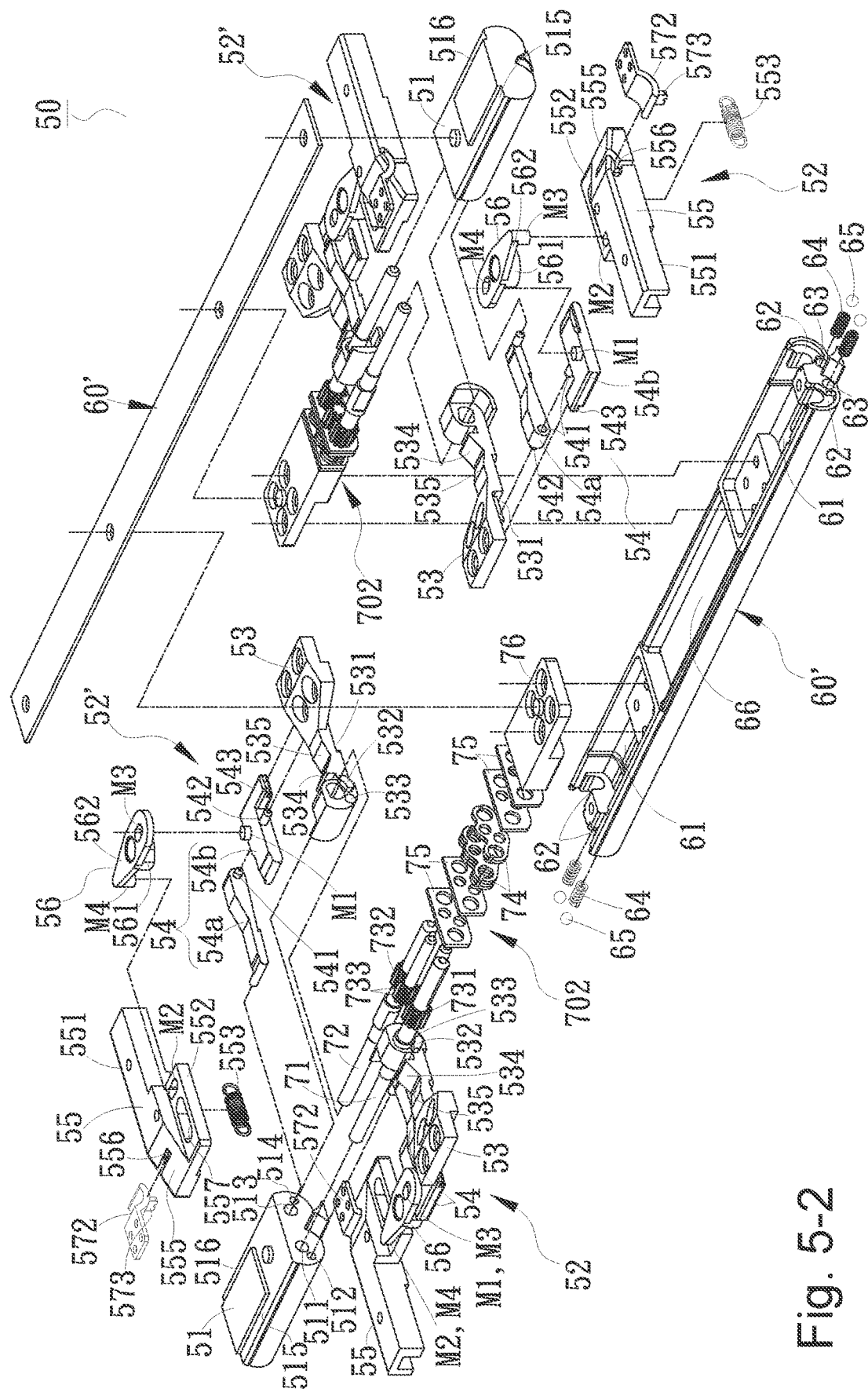
Figure 6:
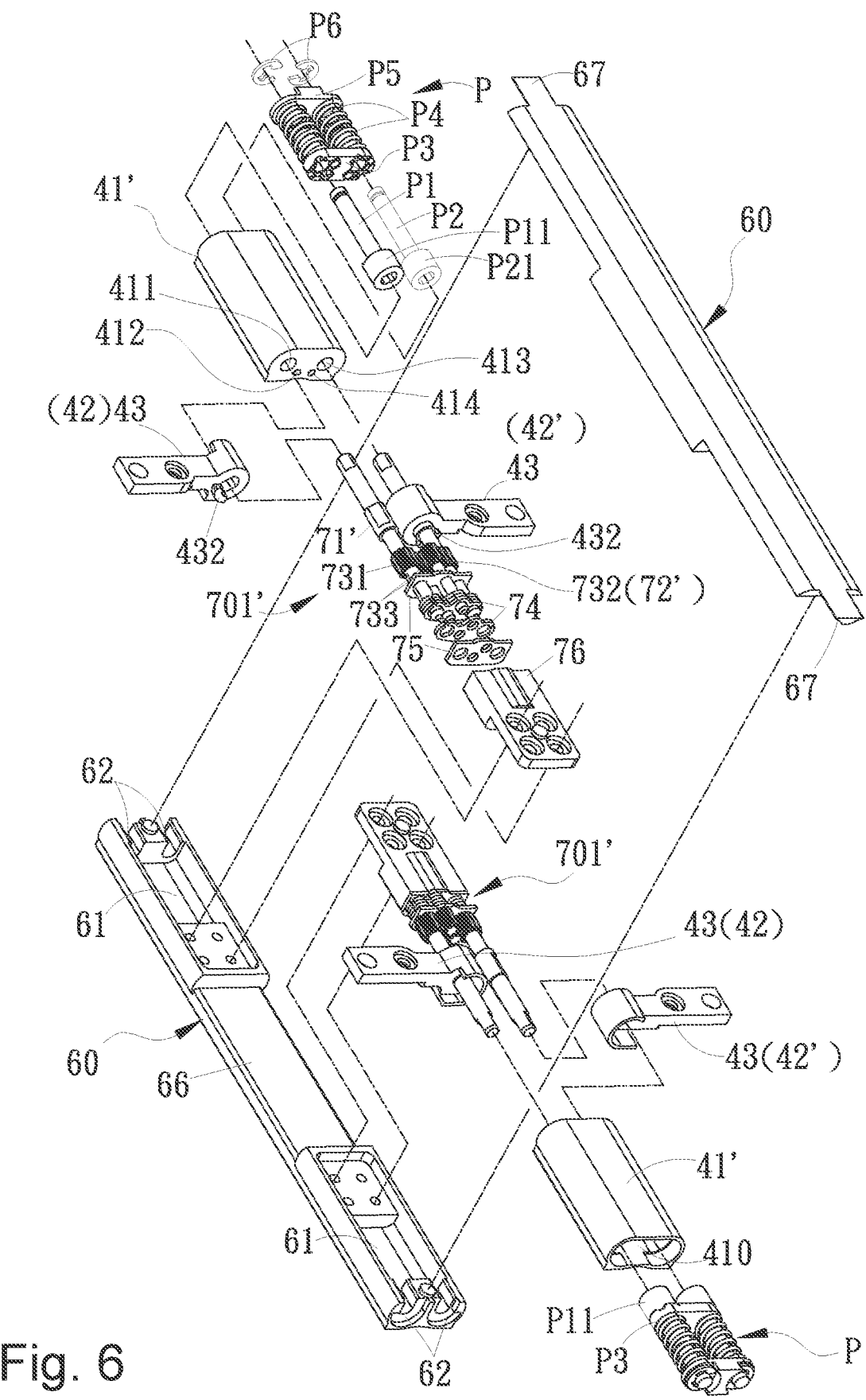
FIG. 6 is an exploded schematic view of a first base, a first extending base, a first hinge device, and each first main linkage member in combination with a positioning and torque unit of the present invention.

In these three embodiments, as shown in FIGS. 5-1 and 5-2, at least one first hinge 701 and at least one second hinge 702 further include a first shaft 71, a second shaft 72, a first gear 731, a second gear 732, at least one intermediate gear 733, a plurality of torque units 74 and a plurality of connection units 75, 76. Each first gear 731 is coaxially connected to one first shaft 71, each second gears 732 is coaxially connected to one second shaft 72, and each of the at least one intermediate gear 733 is located between one first gear 731 and second gear that are correspondingly engaged with the at least one intermediate gear 733 to perform simultaneous movements in a meshing state. The axes of the rotation of each first shaft 71, each second shaft 72, and each at least one intermediate gear 733 are in parallel, and each first shaft 71, each second shaft 72, and each at least one intermediate gear 733 are respectively passed through corresponding plurality of torsion units 74 and connection units 75, which are beneficial to the overall combination and stability, so as to produce the effect of synchronous rotation and torque. The at least one first hinge 701 and the at least one second hinge 702 are respectively locked in the corresponding at least one mounting slot 61 through the respective connecting units 76. Each first shaft 71 and each second shaft 72 are respectively passed through the corresponding limiting groove 62, so as to be connected with and be passed through the end shaft holes of one first and second main linkage members 43, 53, and then each first shaft 71 and each second shaft 72 are respectively connected with one first and third main pivoting portion 411, 413 and one second and fourth main pivoting portion 511, 513, so as to respectively form the main rotation centers of the first and second hinge modules 40, 50. Moreover, the at least one first hinge 701 and the at least one second hinge 702 can be modularized and have the same structure, which is beneficial to reduce costs and simplify manufacturing processes.

In these three embodiments, the combination of the hole 63 and the corresponding hole 433, 533 together with the spring 63 and the ball 65 can also be implemented in another embodiment. Please refer to FIG. 6, a receiving portion 410 is also recessed at the axial side of the first main body 41', and a positioning and torque unit P is accommodated in the receiving portion 410. The positioning and torque unit P includes a first connecting shaft P1, a second connecting shaft P2, and two connecting brackets P3. P5, at least two elastic elements P4, and at least two elastic buckles P6. The first and second connecting shafts P1 and P2 are parallel to each other and are respectively passed through the shaft holes at both ends of a connecting bracket P3, and are respectively sleeved axially with at least one elastic element P4, and then are passed through shaft hole at both ends of another connecting bracket P5, and are respectively fastened by at least one elastic buckle P6. Therefore, after the two mandrels of the at least one first hinge 701' (that is, the first shaft 71' and the second shaft 72') are respectively pivotally connected to one end of each first main linkage members 43, the mandrel (first shaft 71') of the at least one first hinge of 701' is coaxial and passed through the first main pivoting portion 411 of the first main body 41' to be axially connected with the first connection shaft P1. Another mandrel (the second shaft 52) of at least one first hinge 701' is coaxial and passed through the third main pivoting portion 413 of the first main body 41' to be axially connected with the second connecting shaft P2 to form the two main rotation center axes of the first hinge module 40. The first connecting shaft P1 is combined with a first cam P11, and the second connecting shaft P2 is combined with a second cam P21. The contact surfaces of the connecting bracket P3 and the first and second cams P11, P21 respectively form positioning grooves and projections that can be pushed and engaged with each other, so as to allow each base to be positioned in a unfolded or folded state, thereby assisting the overall support to maintain the positioning in a unfolded or folded state. On the other hand, the first extension base 60 also has at least one axial extension portion 67, which is for replacing the axial extension portion 415 of the first main body 41, and such arrangement can also partially shield the ends of the first main linkage member 43 and the gaps between the ends and has both supportive and aesthetic effects.

In these three embodiments, in order to prevent the flexible display 90 from floating arbitrarily, an adhesive layer 80 is provided between flexible display 90 and the same sides of the docking housing 12 of the first base 10, the docking housing 22 of the second base 20, the docking housing 32 of the third base 30, each support plate body 57, 57' of the second sliding unit, and the main body 41 and the second main body 51, as shown in FIGS. 25 and 26. The adhesive layer 80 includes a first adhesive region 81, a second adhesive region 82, a third adhesive region 83, a first auxiliary adhesive region 84, and a second auxiliary adhesive region 85. The first adhesive region 81 is laid on one side of the docking housing 12 of the first base 10, and the second adhesive region 82 is laid on one side of the docking housing 22 included in the second base 20 and a lateral part of the support plate 57, and the third adhesive region 83 is laid on one side of the docking housing 32 included in the third base 30 and a lateral part of another supporting plate 57'. The first auxiliary adhesive area 84 is laid in the middle part of one side of the first hinge module 40 (that is, on the first main body 41 and the first extension base 60 shown in the FIG. 26), and the second auxiliary adhesive area 85 is laid on the middle part of the one side of the second hinge module 50 (that is, on the second main body 51 and the second extension base 60' shown in the FIG. 26).

Figure 7:
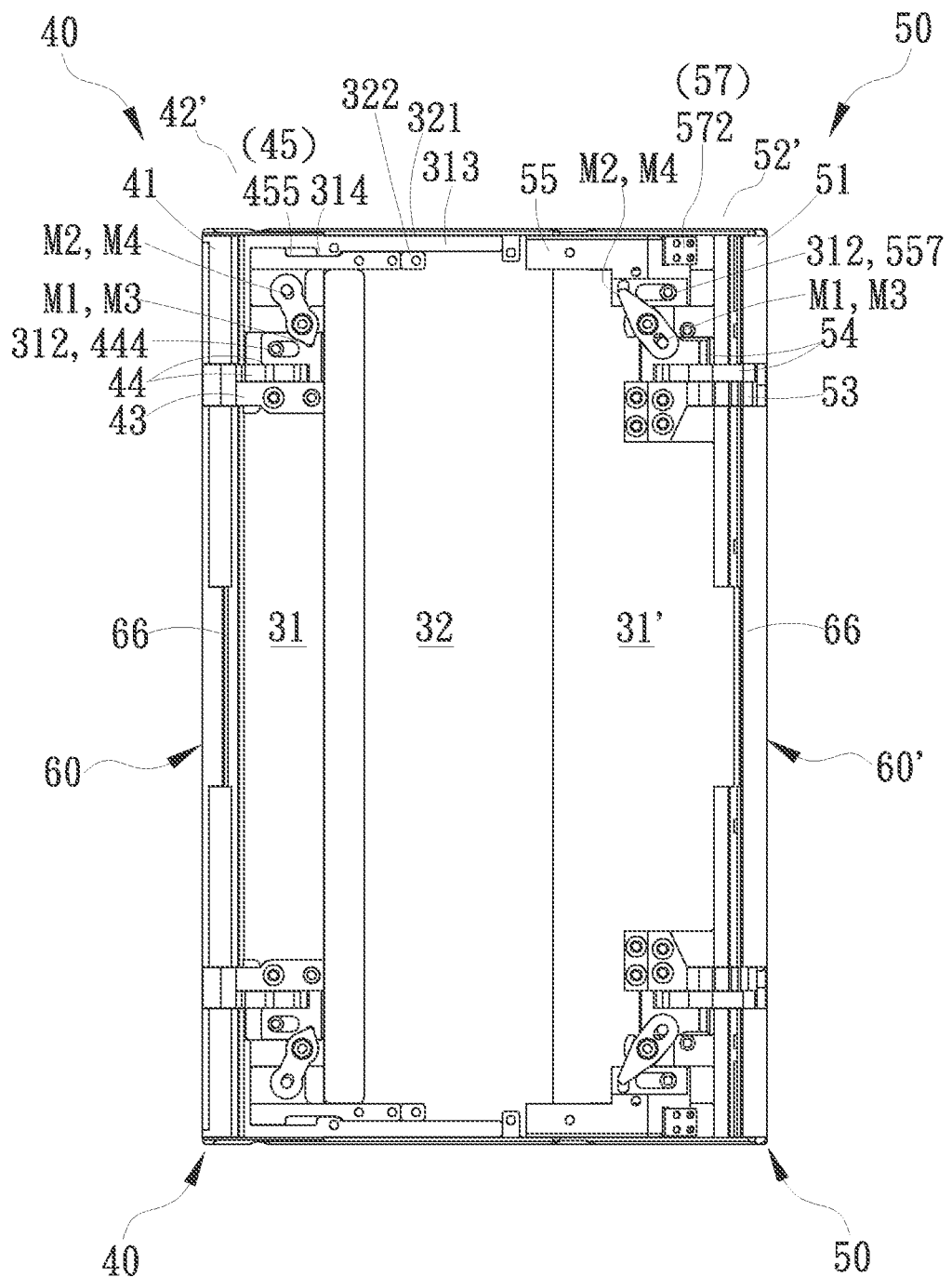
FIG. 7 is a top view of the folding-length-difference compensatory mechanism of FIG. 1 exposed in the third base (in order to show the internal mechanism when the folding-length-difference compensatory mechanism is folded, and the second base, the partial second hinge module, and the plate of the third base are removed).
Figure 8:
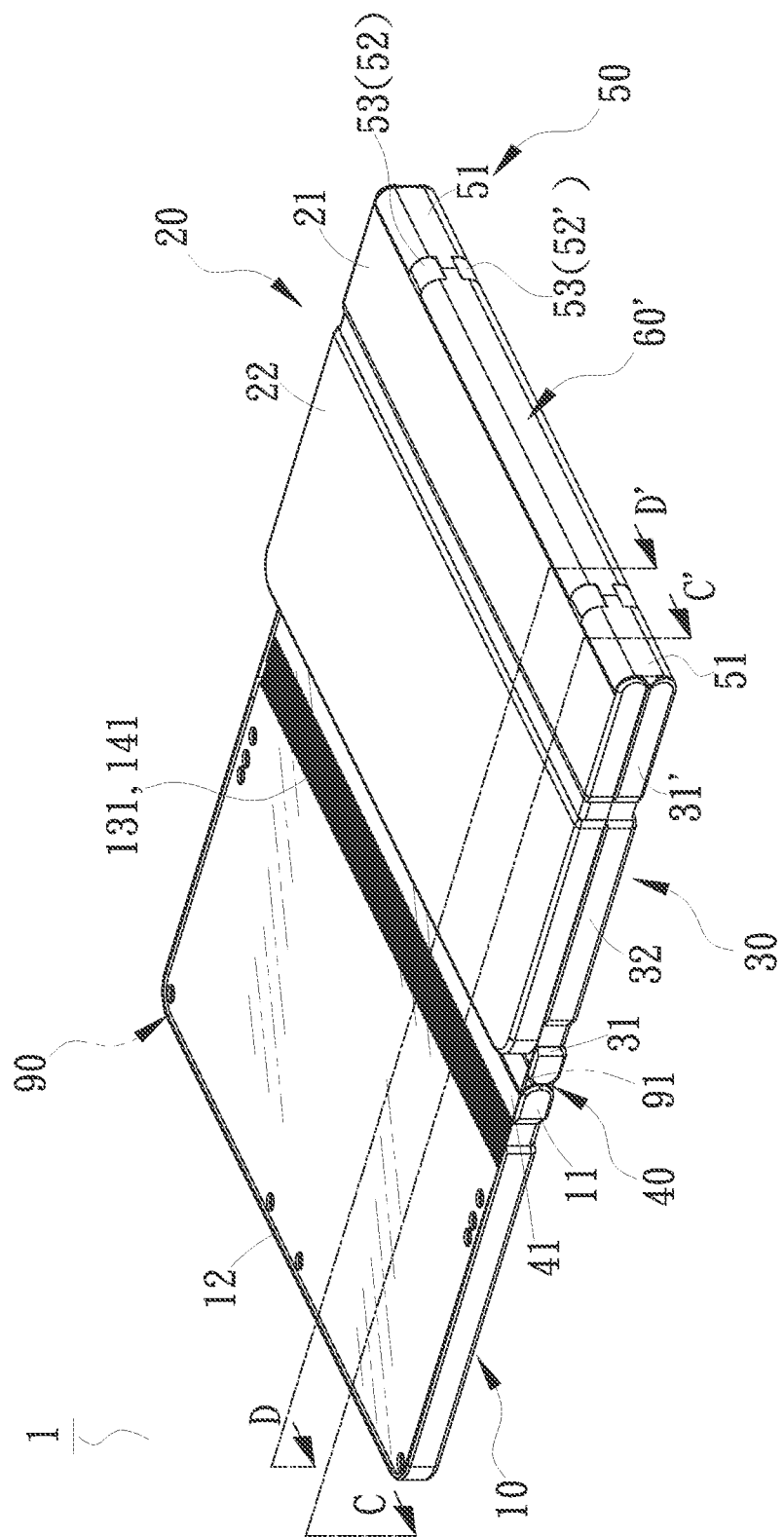
FIG. 8 is a perspective view showing the first base, the first hinge module, and the third base in an unfolded state in FIG. 1 (in order to show the structure when the folding-length-difference compensatory mechanism is unfolded, where the flexible display in FIG. 8 is represented by virtual lines).
Figure 9:
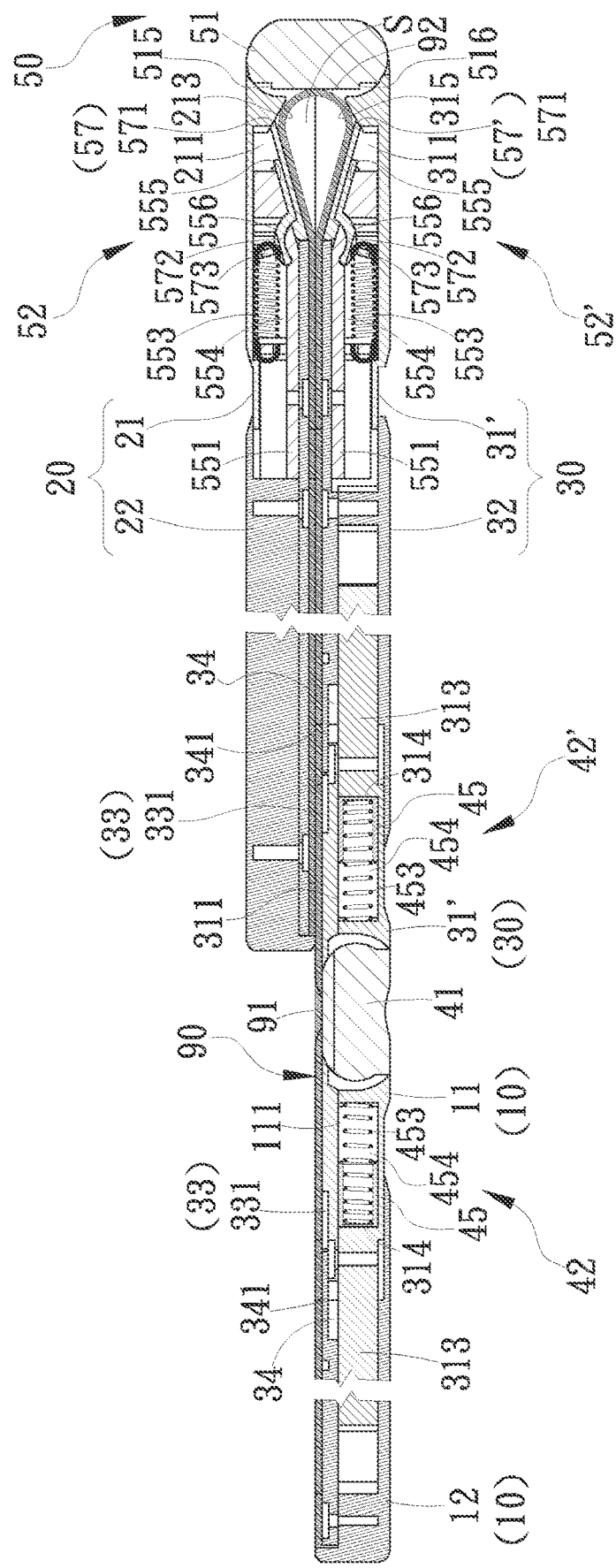
FIG. 9 is a cross-sectional view along the line C to C' in FIG. 8.
Figure 10:
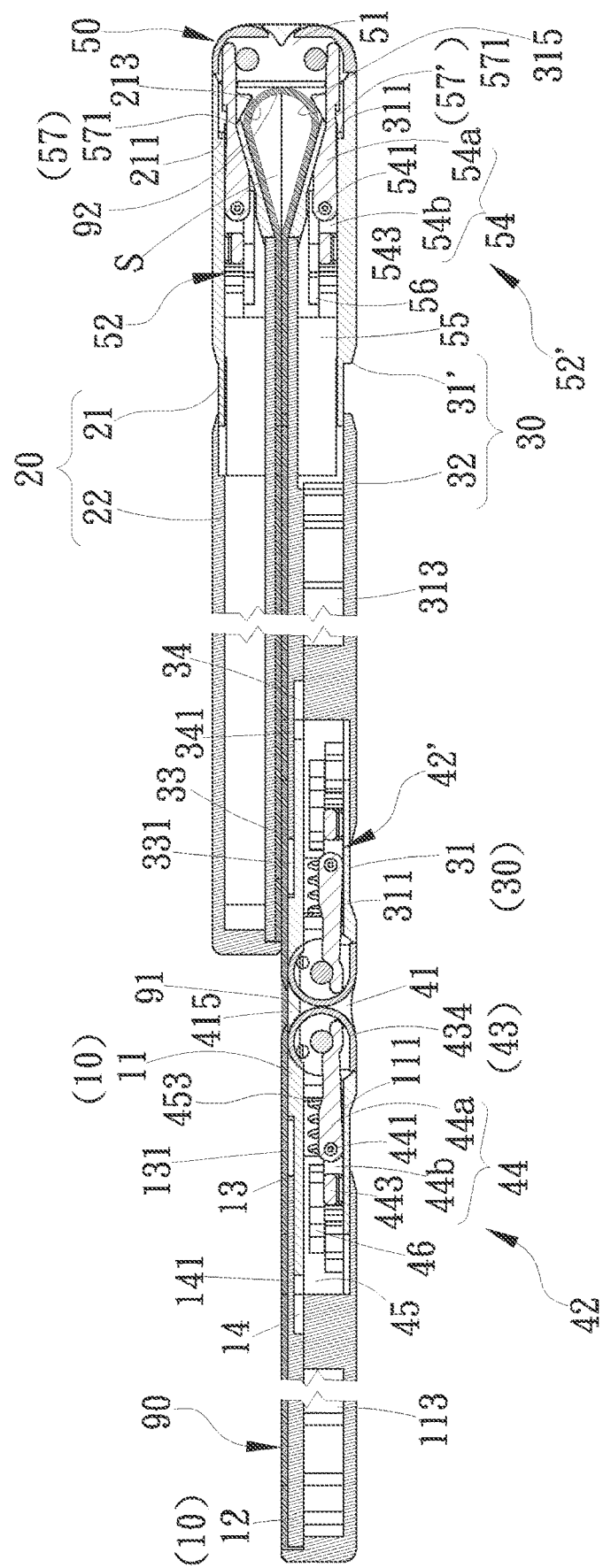
FIG. 10 is a cross-sectional view along the line D to D' of FIG. 8.
Figure 11:
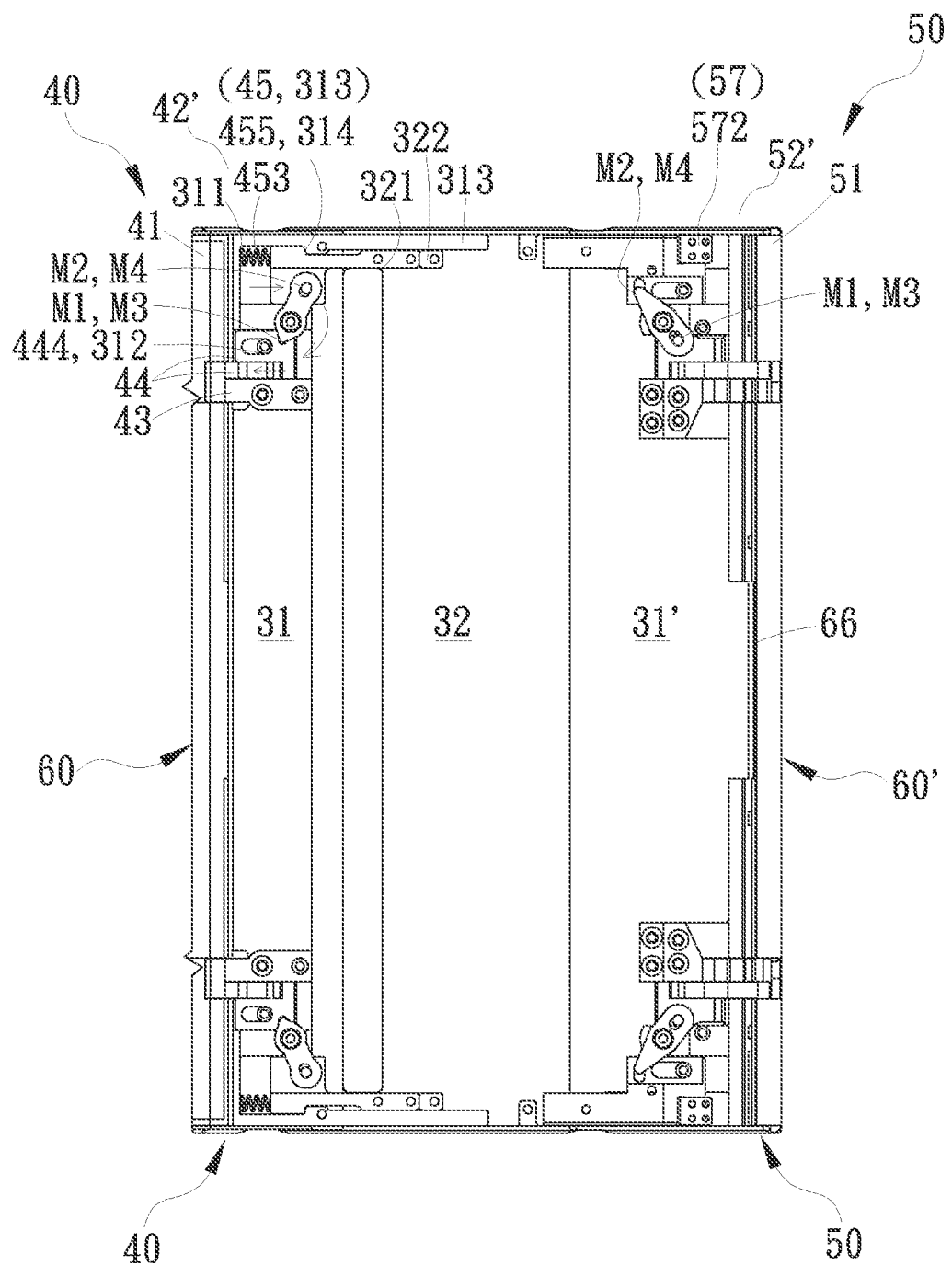
FIG. 11 is a top view of the folding-length-difference compensatory mechanism of FIG. 8 exposed in the third base (in order to show the internal mechanism after the folding-length-difference compensatory mechanism is unfolded, the first base, the partial first hinge module, the second base, the partial second hinge module, and the plate of the third base are removed).
Figure 12:
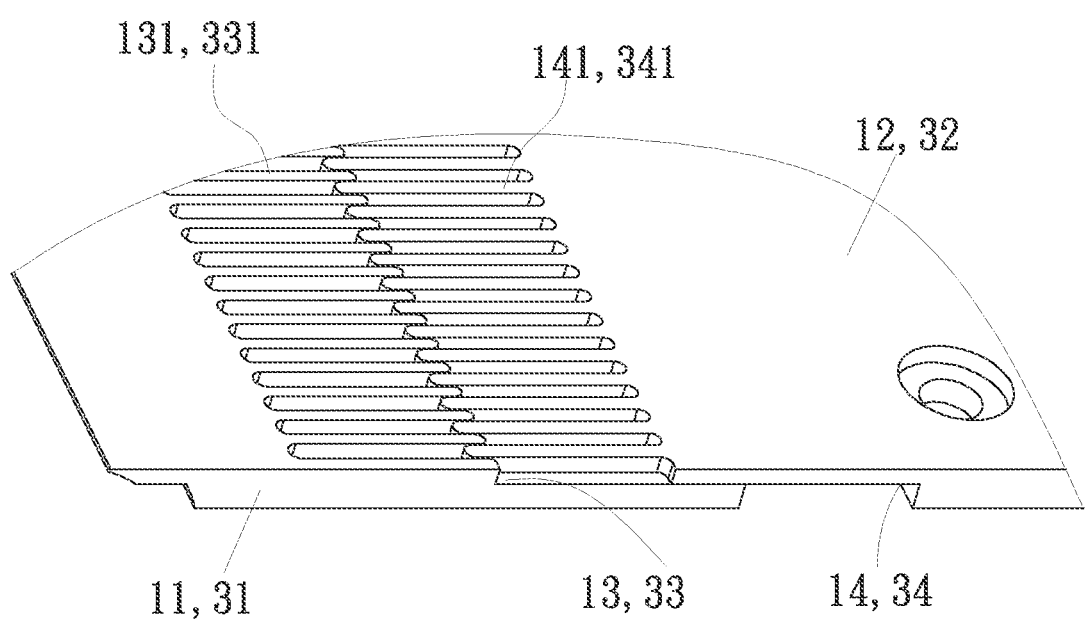
FIG. 12 is a partially enlarged view of the guiding structure of the first and third bases of FIG. 8 in an unfolded state.
Figure 13:
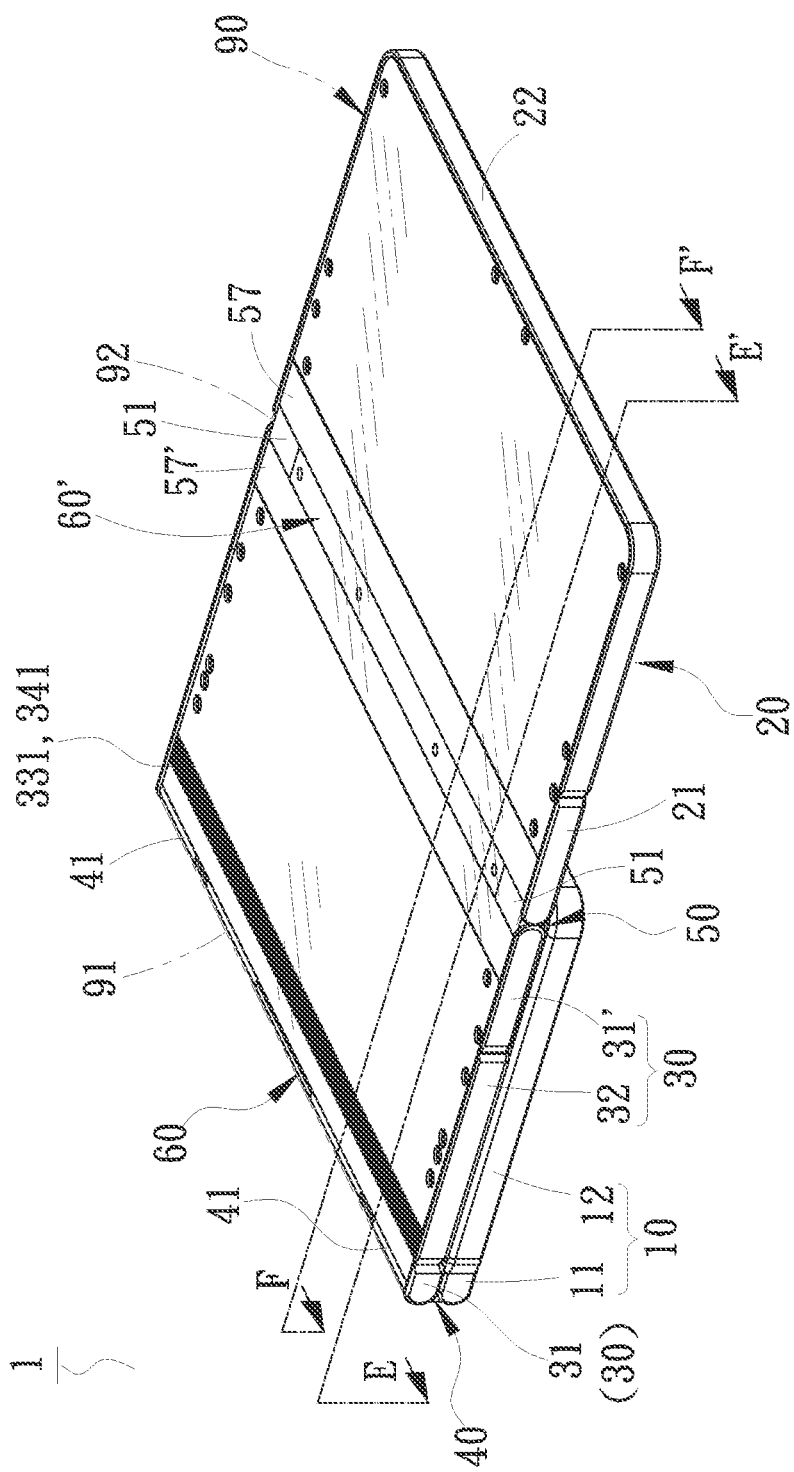
FIG. 13 is a perspective view showing the unfolded state of the second base, the second hinge module and the third base of FIG. 1 (in order to show the inwardly folded part, where the flexible display in the FIG. 13 is represented by virtual lines).
Figure 14:
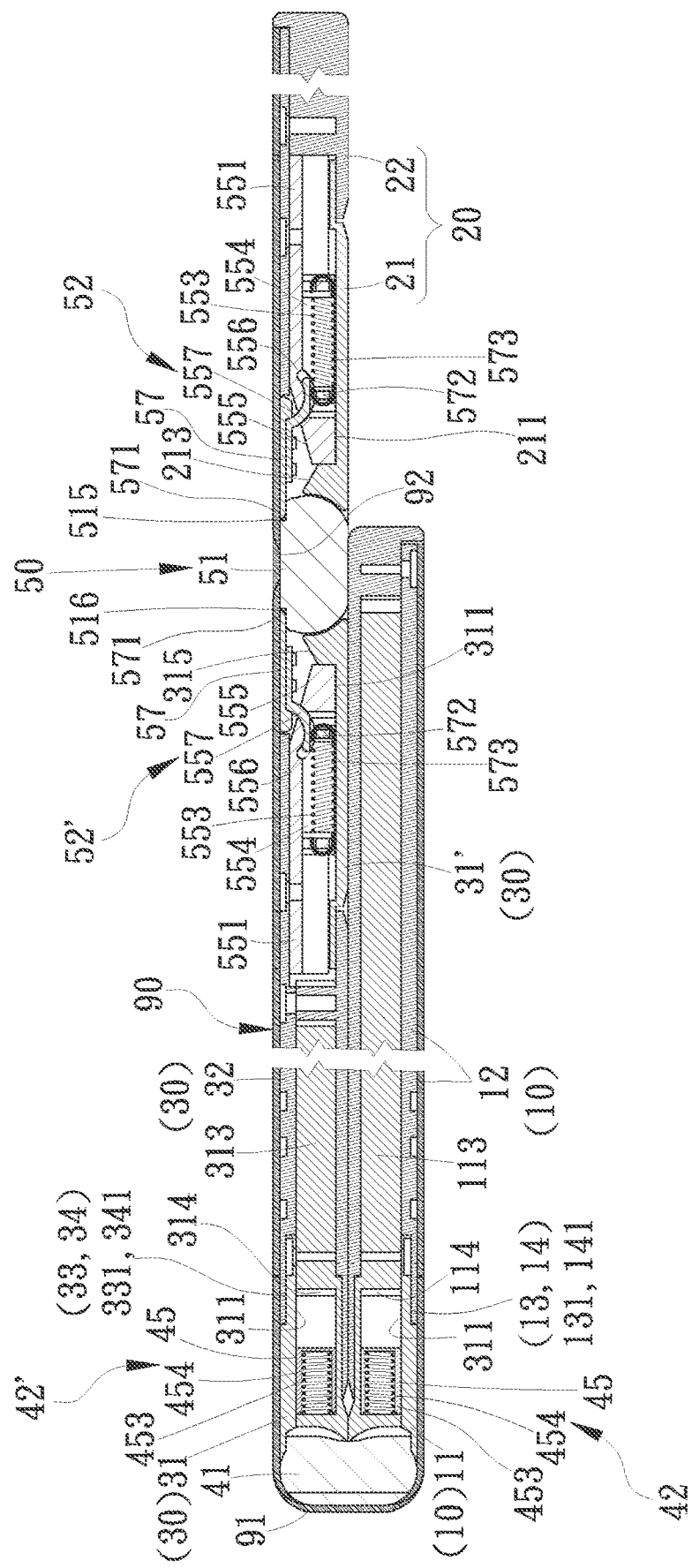
FIG. 14 is a cross-sectional view along a line E to E' of FIG. 13.
Figure 15:
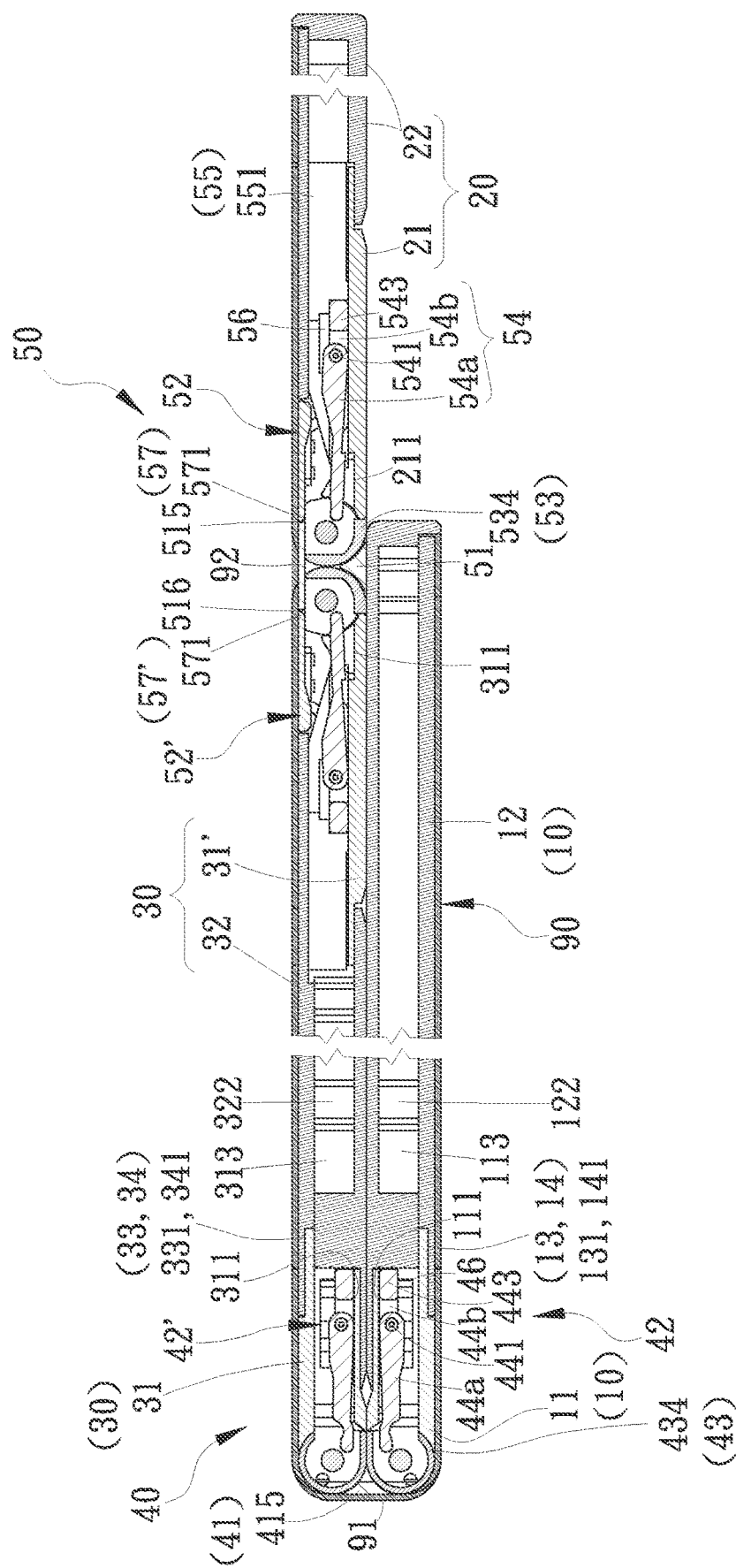
FIG. 15 is a cross-sectional view along a line F to F' of FIG. 13.
Figure 16:
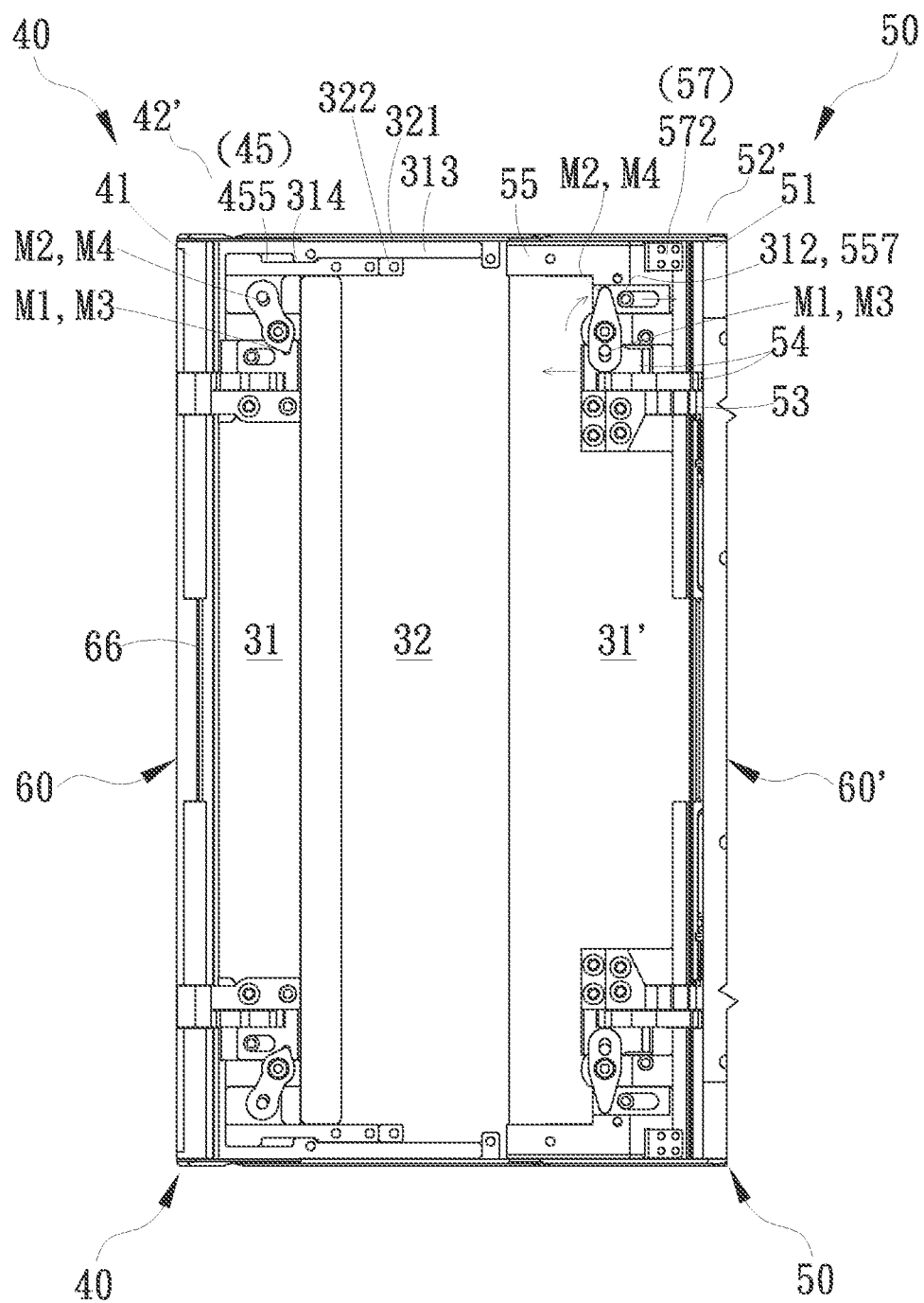
FIG. 16 is a top view of the folding-length-difference compensatory mechanism of FIG. 13 exposed in the third base; in order to show the internal mechanism when the folding-length-difference compensatory mechanism is unfolded, and the second hinge module and the plate of the third base are removed.
Figure 17:
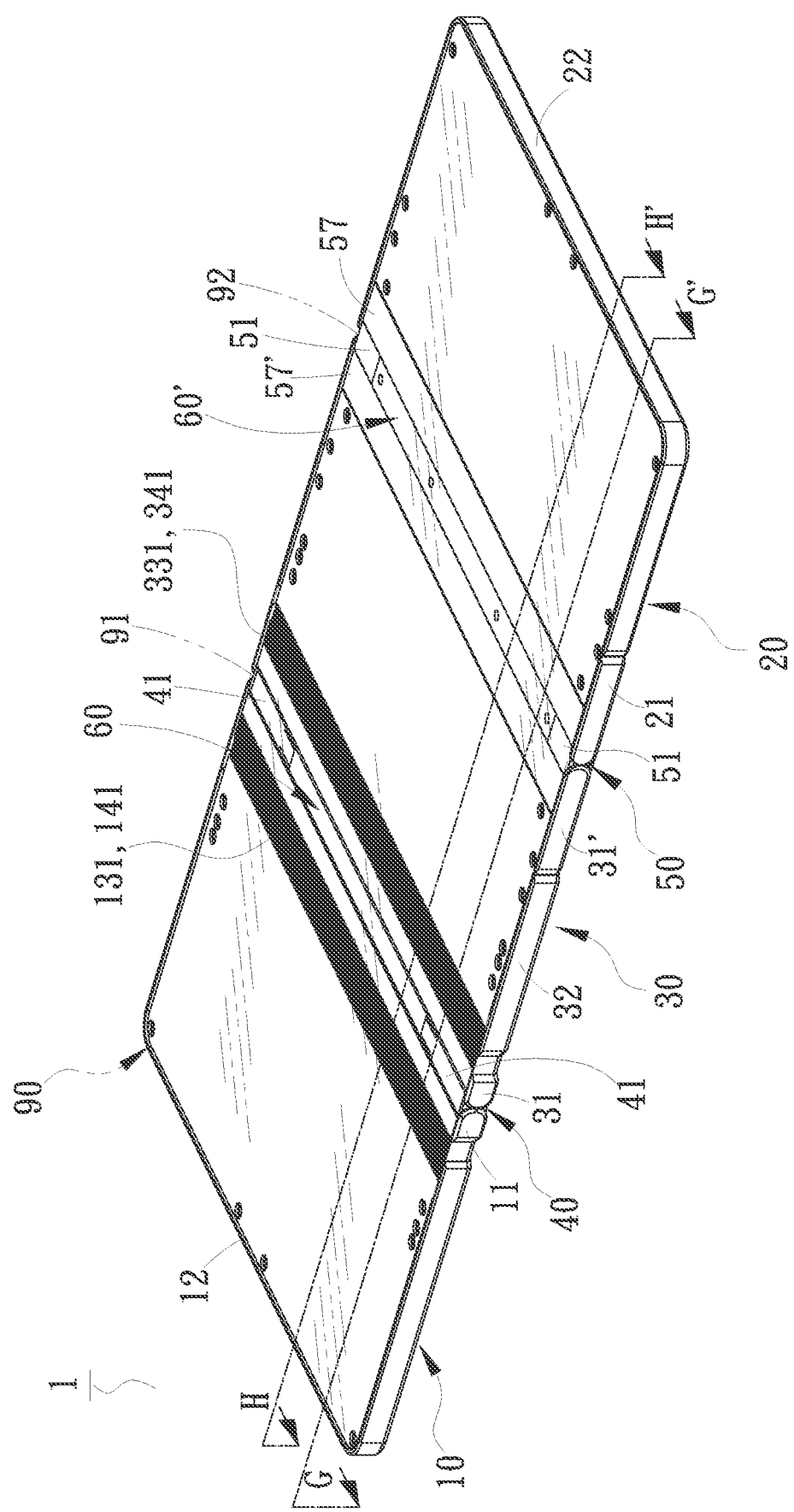
FIG. 17 is a perspective view showing the unfolded state of the three housing and the two hinge modules of FIG. 1, in order to show the inwardly folded and outwardly folded parts, the flexible display in the FIG. 17 is indicated by virtual lines.
Figure 18:
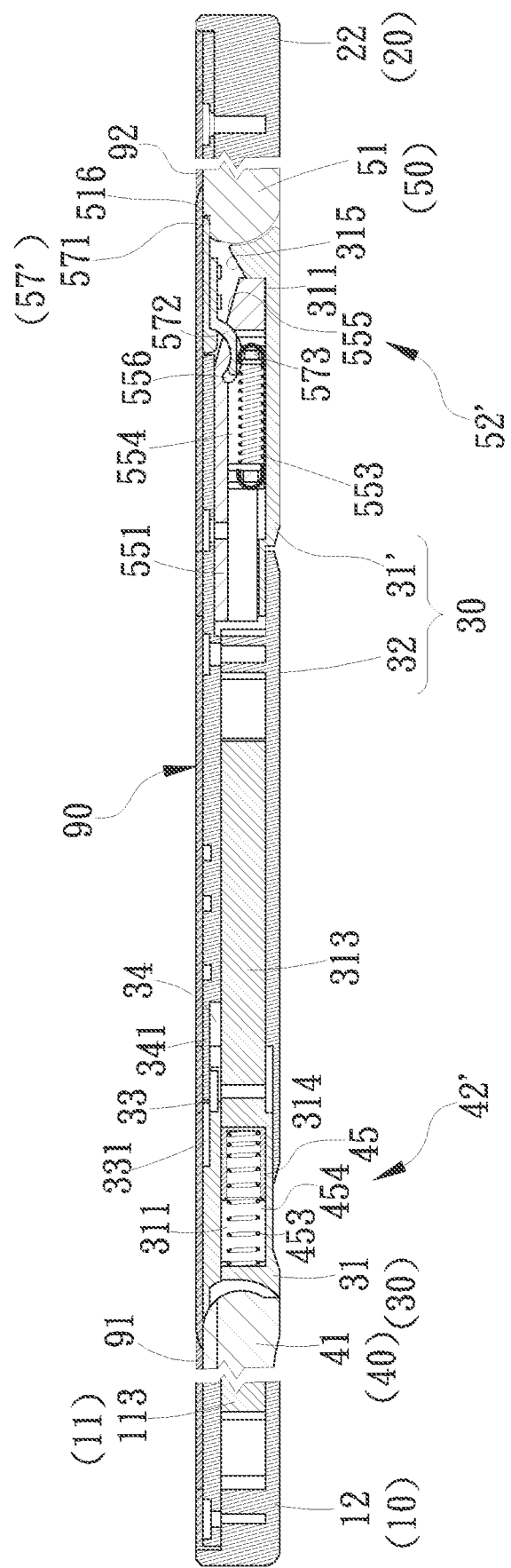
FIG. 18 is a cross-sectional view along the line E to E' in FIG. 17 (the cross-sections of the first and second bases is omitted by referring to FIGS. 9 and 14 respectively).
Figure 19:
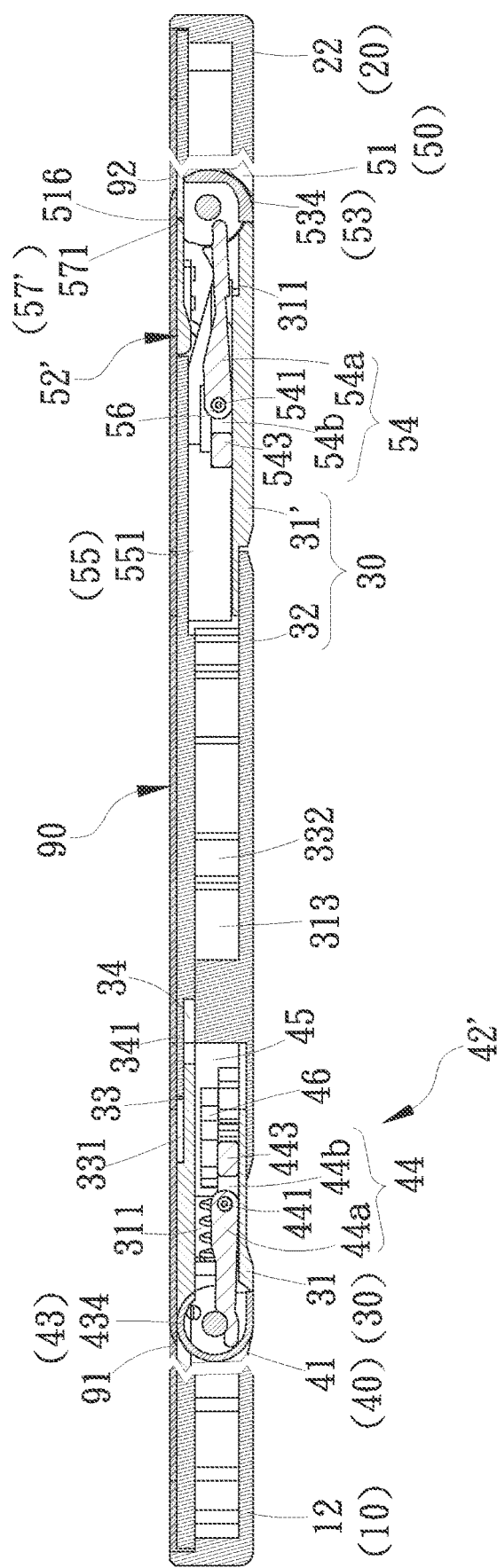
FIG. 19 is a cross-sectional view along the line F to F' in FIG. 17, where the cross-sections of the first and second bases are omitted by referring to FIGS. 10 and 15 respectively.
Figure 20:
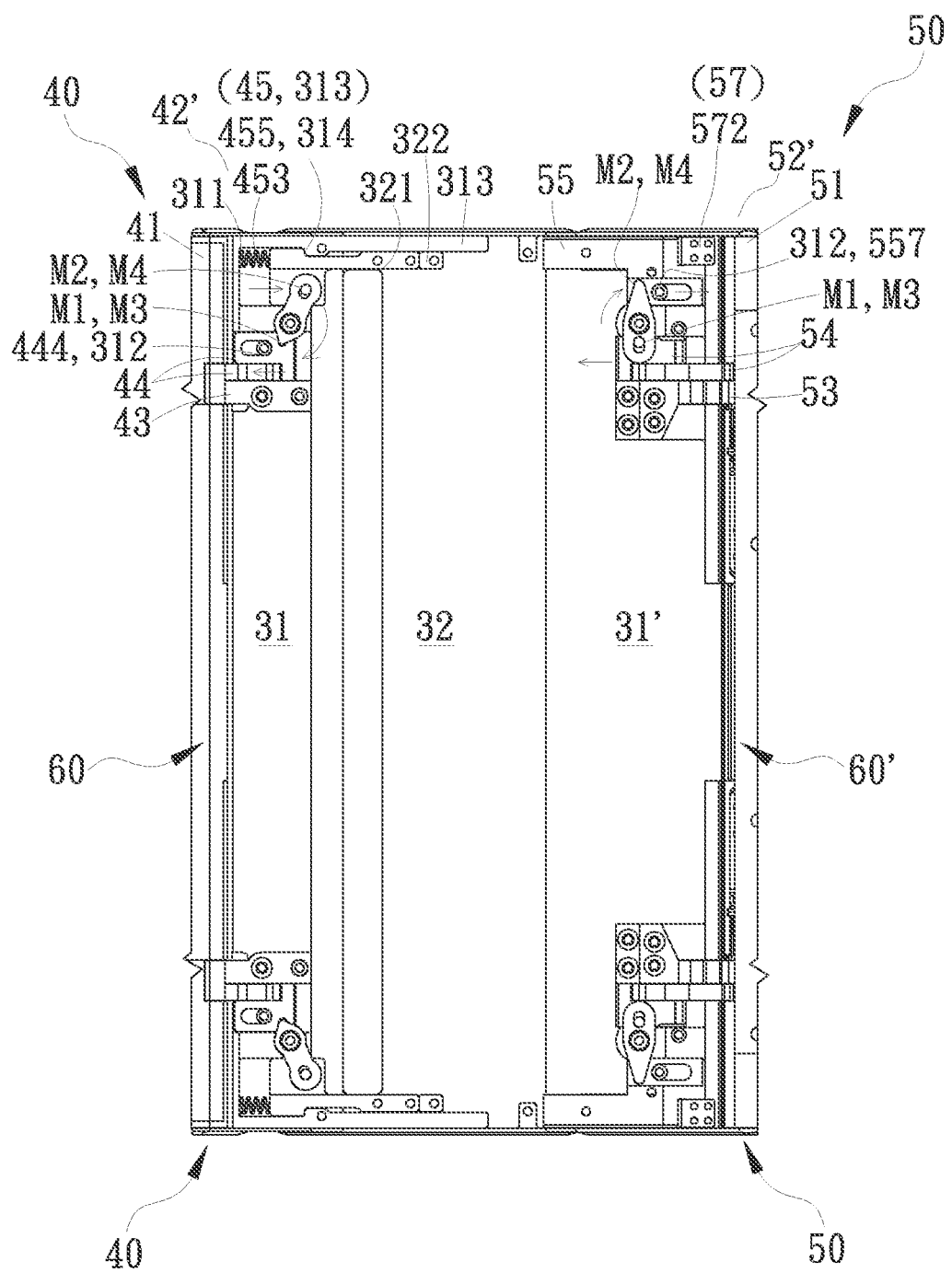
FIG. 20 is a top view of the folding-length-difference compensatory mechanism of FIG. 17 exposed in the third base, in order to show the internal mechanism when the folding-length-difference compensatory mechanism is unfolded, and the first base, the partial first hinge module, the second base, the partial second hinge module, and the plate of the third base are removed.
Figure 27:
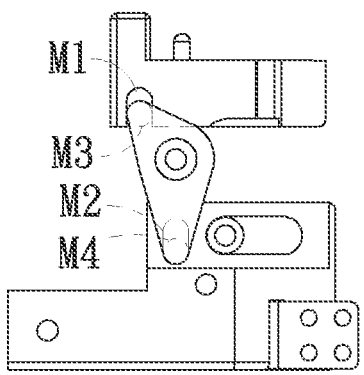
FIGS. 27 to 34 show embodiments in which the four operation areas of the sliding unit of the present invention adopt other combinations.
Figure 28:
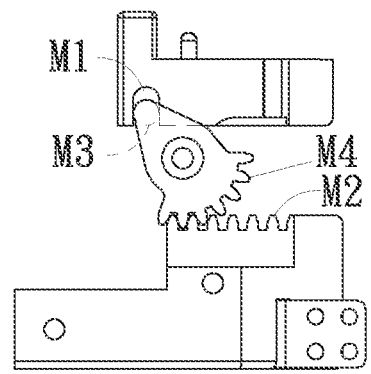
Figure 29:
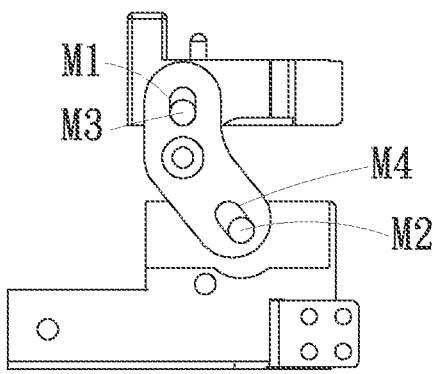
Figure 31:
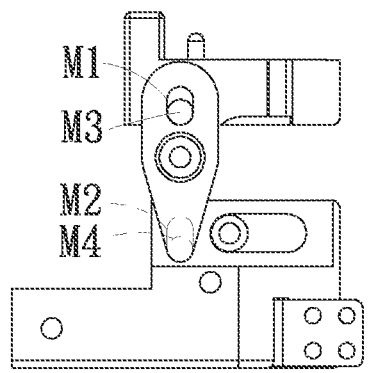
Figure 32:
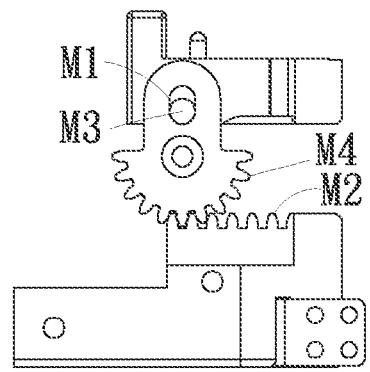

In these three embodiments, each operating area of the first, second, third, and fourth sliding units 42, 42', 52, 52' can also be designed into the following various technical solutions, such as the first sliding unit of FIG. 7 and the second sliding unit of FIGS. 27 to 34. The technical solutions between the first and third operation areas M1 and M3 are as follows:

1. Referring to FIG. 7, FIG. 27, and FIG. 28, the first operation area M1 is an axial guiding hole formed on the surface of the linkage plate, and the third operation area M3 is a protruding pillar extended vertically from one end of the first and second intermediate transmission members, such that the protruding pillar is movable within the axial guiding hole.
2. Referring to FIG. 29, FIG. 31, and FIG. 32, the first operation area M1 is a protruding pillar extended vertically from the surface of the linkage plate, and the third operation area M3 is a long guiding hole formed at one end of the second intermediate transmission member, such that the protruding pillar is movable within the long guiding hole.

Figure 30:
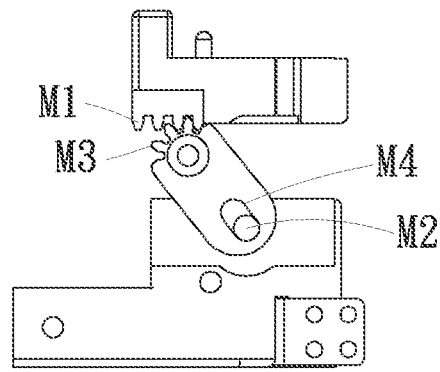
Figure 33:
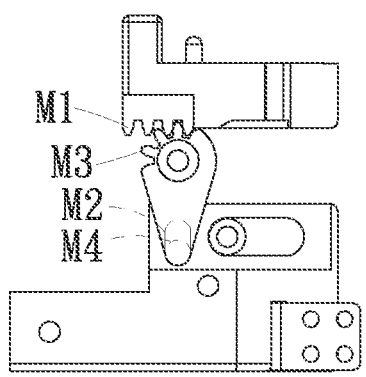
Figure 34:
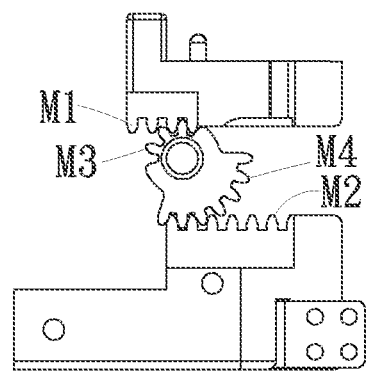

3. Referring to FIG. 30, FIG. 33, and FIG. 34, the first operation area M1 is a rack formed on the side of the linkage plate, and the third operation area M3 is a toothed structure annularly arranged along the peripheries of one end of the second intermediate transmission member, which causes the rack to rotate in a meshing manner, such that the toothed structure is moved with the other toothed structure. Moreover, the technical solutions between the second operation area M2 and the fourth operation area M4 are as follows:

1. Referring to FIG. 7, FIG. 29, and FIG. 30, a lateral wing is extended in the direction from one side of the first and second sliding members toward the first and second intermediate transmission members, and the second operating area M2 is a protruding pillar extended vertically from the blade surface of the lateral wing, the fourth operation area M4 is a long guiding hole formed at the other end of the first and second intermediate transmission members, such that the protruding pillar can be movably drawn within the long guiding hole.

2. Referring to FIG. 27, FIG. 31, and FIG. 33, a lateral wing is extended in a direction from one side of the second sliding member to the second intermediate transmission member. The second operation area M2 is an axial guiding hole is formed on the blade surface of the lateral wing, and the fourth operation area M4 is a protruding pillar extended vertically from the other end of the second intermediate transmission member, such that the protruding pillar can be movably drawn within the axial guiding holes.

3. Referring to FIG. 28, FIG. 32, and FIG. 34, a lateral wing is extended in a direction from one side of the second sliding member to the second intermediate transmission member. The second operation area M2 is a rack formed at the edge of the lateral wing. The fourth operation area M4 is a toothed structure arranged annularly along the peripheries of the other end of the second intermediate transmission member. In this way, the toothed structure is caused to rotate in a meshing manner by the rack to be moved with the rack.

In this way, as described above, the flexibility in design can be improved by the operation areas that are paired together with technical arrangements, such as protruding pillars with long guiding holes or axial guiding holes, and racks with tooth structures.

An advantage of the present invention is that at least one sliding unit is provided in each hinge module of the folding-length-difference compensatory mechanism, and effect of the length difference compensation is produced through the main linkage member of the at least one sliding unit together with the sub-linkage member, the sliding member, and the intermediate transmission, and the sub-linkage member make it possible for the synchronous changes of the operation through the traction of the main linkage member. At the inward bending point, the curved feet of the supporting plate body together with the curved guiding groove of the sliding member can produce a pivoting effect without a real shaft, and at the outward bending point, an end guiding structure and a lateral guiding structure are respectively formed between the two housings of the bases, which can coordinately and stably compensate the folding-length-difference, and is more convenient for the conversion between a folded state and an unfolded state. The folding-length-difference compensatory mechanism also can produce the effects of sharing loads, reducing the volume and reducing the thickness, and effectively thinning the whole structure and simplifying the overall components. In this way, after the whole structure is folded, the bases can be overlapped with each other to provide the two curved parts of the flexible display with small bending curvature. When the whole structure is unfolded, the two bending parts that is unfolded can form a stable supporting. Moreover, the present invention is also convenient for disassembly and installation, and thus it can be replaced with the first or second hinge module at the two bending points of the whole structure, so as to form a double-outward folding or double-inward folding length difference compensatory mechanism for the multi-foldable type device.

What is claimed is:

1. A folding-length-difference compensatory mechanism for the multi-step foldable device, comprising:
    a first base, a first hinge module, a second base, a second hinge module and a third base; where the first hinge module is respectively connected with one end of the first base and one end of the third base, and the second hinge module is respectively connected with opposite ends of the second base and the third base, and a flexible display is provided on the same sides of the first hinge module, the second hinge module, the first base, the second base and the third base; wherein the third base and/or the first base or the second base includes a connecting housing and a docking housing that are relatively slidable with each other;
    the first hinge module including:
    a first main body, one end of which has a first main pivoting portion and a first sub-pivoting portion that are spaced from each other; and
    a first sliding unit, including:
        a first main linkage member, opposite ends of which pivotally connected to the first main pivoting portion and connected to the connecting housing respectively;
        a first sub-linkage member, having one end pivotally connected to the first sub-pivoting portion, where a pivoting node is formed between two ends of the first sub-linkage member, such that another end of the first sub-linkage member is movable relatively to and limited by the first main linkage member;
        a first sliding member, one end of which is movable relative to and limited by the connecting housing, where the first sliding member has an opposite end connected with the docking housing; and
        a first intermediate transmission member, pivotally connected to the connecting housing, wherein the first intermediate transmission member has two ends respectively moveable with another end of the first sub-linkage member and the first sliding member, such that the one end of the first sub-linkage member and the first sliding member are respectively moved in reverse directions, for the first sliding member to drive the docking housing to be movable relative to the connecting housing that is connected with the docking housing.

2. A folding-length-difference compensatory mechanism for a multi-step-foldable device, comprising:
    a first base, a first hinge module, a second base, a second hinge module and a third base;
    where the first hinge module is respectively connected with one end of the first base and one end of the third base, and the second hinge module is respectively connected with opposite ends of the second base and the third base, and a flexible display is provided on the same side of the first hinge module, the second hinge module, the first base, the second base and the third base; wherein the third base and/or the second base or the first base includes a connecting housing and a docking housing that are relatively slidable with each other;
the second hinge module including:
a second main body, one end of which has a second main pivoting portion and a second sub-pivoting portion and a stopping portion; and
a second sliding unit, including:
a second main linkage member, opposite ends of which being pivotally connected to the second main pivoting portion and connected to the connecting housing respectively;
a second sub-linkage member, having one end pivotally connected to the second sub-pivoting portion, where a pivoting node is formed between two ends of the second sub-linkage member, such that other end of the second sub-linkage member is moveable relatively and limited by the second main linkage member;
a second sliding member, one end of which is movable relative to and limited by the connecting housing, where the second sliding member has an opposite end connected with the docking housing, and the second sliding member is further provided with a curved guiding groove;
a second intermediate transmission member, pivotally connected to the connecting housing, wherein the second intermediate transmission member has two ends movable respectively with another end of the second sub-linkage member and the second sliding member, such that the one end of the second sub-linkage member and the second sliding member are respectively moved in reverse directions; and
a support plate body, one end of which is a corresponding stopping portion for in connection with or in disconnection with the stopping portion, and one side of opposite end of the support plate body is provided with a curved plate foot for guiding the curved guiding groove in a curved sliding way, such that the support plate body is slid by the second sliding member and tilted relative to the second sliding member, for the second sliding member to drive the docking housing to be moveable relative to the connecting housing that is connected with the docking housing.

3. A folding-length-difference compensatory mechanism for the multi-step foldable device, comprising:
a first base, a first hinge module, a second base, a second hinge module and a third base;
where the first hinge module is respectively connected with one end of the first base and one end of the third base, and the second hinge module is respectively connected with opposite ends of the second base and the third base, and a flexible display is provided on the same sides of the first hinge module, the second hinge module, the first base, the second base and the third base; wherein the folding-length-difference compensatory mechanism is characterized in that: the first base and the second base includes a connecting housing and a docking housing that are relatively slidable with each other; the third base includes two connecting housings and a docking housing that is relatively slidable between the two connecting housings; the first hinge module includes a first main body, one end of which has a first main pivoting portion and a first sub-pivoting portion that are spaced from each other; and
a first sliding unit, including:
a first main linkage member, opposite ends of which pivotally connected to the first main pivoting portion and connected to the connecting housing respectively;
a first sub-linkage member, having one end pivotally connected to the first sub-pivoting portion, where a pivoting node is formed between two ends of the first sub-linkage member, such that another end of the first sub-linkage member is movable relatively to and limited by the first main linkage member;
a first sliding member, one end of which is movable relative to and limited by the connecting housing, where the first sliding member has an opposite end connected with the docking housing; and
a first intermediate transmission member, pivotally connected to the connecting housing, wherein the first intermediate transmission member has two ends respectively moveable with another end of the first sub-linkage member and the first sliding member, such that the one end of the first sub-linkage member and the first sliding member are respectively moved in reverse directions, for the first sliding member to drive the docking housing to be movable relative to the connecting housing that is connected with the docking housing, and further includes a third sliding unit having a structure corresponding to the first sliding unit, and the first and third sliding units are symmetrically provided respectively at both ends of the first main body; a third main pivoting portion and a third sub-pivoting portion that are spaced from each other are further provided at the opposite ends of the first main body, and the third main pivoting portion and the third sub-pivoting portion are respectively with the first main pivoting portion and the first sub-pivoting portion to be provided symmetrically at the opposite end of the first main body respectively; ends of each first main linkage member are pivotally connected to the first and third main pivoting members, respectively, and opposite ends of each first main linkage members are respectively connected to each connection housings; ends of each first sub-linkage members are pivotally connected with the first and third sub-pivoting members, respectively, and opposite ends of each first sliding member are connected with each docking housing respectively, such that when the first base is folded or unfolded relative to the third base, each first sliding member respectively drives one docking housings to be movable relative to the connecting housing that is connected with the docking housing, and the second hinge module includes a second main body, one end of which has a second main pivoting portion and a second sub-pivoting portion and a stopping portion; and
a second sliding unit, including:
a second main linkage member, opposite ends of which being pivotally connected to the second main pivoting portion and connected to the connecting housing respectively;
a second sub-linkage member, having one end pivotally connected to the second sub-pivoting portion, where a pivoting node is formed between two ends of the second sub-linkage member, such that other end of the second sub-linkage member is moveable relatively and limited by the second main linkage member;
a second sliding member, one end of which is movable relative to and limited by the connecting housing, where the second sliding member has an opposite end connected with the docking housing, and the second sliding member is further provided with a curved guiding groove;
a second intermediate transmission member, pivotally connected to the connecting housing, wherein the second intermediate transmission member has two ends movable respectively with another end of the second sub-linkage member and the second sliding member, such that the one end of the second sub-linkage member and the second sliding member are respectively moved in reverse directions; and a support plate body, one end of which is a corresponding stopping portion for in connection with or in disconnection with the stopping portion, and one side of opposite end of the support plate body is provided with a curved plate foot for guiding the curved guiding groove in a curved sliding way, such that the support plate body is slid by the second sliding member and tilted relative to the second sliding member, for the second sliding member to drive the docking housing to be moveable relative to the connecting housing that is connected with the docking housing, and further includes a fourth sliding unit having a structure corresponding to the second sliding unit, and symmetrically provided at both ends of the second main body; a fourth main pivoting portion, a fourth sub-pivoting portion, and another blocking portion are further provided at the opposite end of the second main body, and the fourth main pivoting portion, the fourth sub-pivoting portion, and another blocking portion are corresponding to the second main pivoting portion, the second sub-pivoting portion, and the blocking portion to be symmetrically provided at opposite ends of the second main body; ends of each second main linkage members are pivotally connected with the second main pivoting portion and the fourth main pivoting portion, and opposite ends of each second main linkage member are respectively connected with one connecting housings, ends of each second sub-linkage member are pivotally connected with the second sub-pivoting portion and the fourth sub-pivoting portion respectively, and opposite ends of each second sliding member are connected with one docking housings respectively, such that when the second base is folded or unfolded relative to the third base, each second sliding member respectively drives one docking housings to be movable relative to the connecting housing that is connected with the docking housing.

4. The folding-length-difference compensatory mechanism for the multi-step foldable device of claim 1, wherein the first sub-linkage member further includes a linkage lever and a linkage plate, one end of the linkage lever is pivotally connected with the first sub-pivoting portion, and an opposite end of the linkage lever is pivotally connected with one side of the linkage plate to form a pivot node; the opposite end of the linkage lever is further protruded to form a protruding shaft; the protruding shaft and the pivot node are located on the same rotation axis, and the side of the linkage plate from which one lateral sheet is further protruded, such that the lateral sheet is parallel to the protruding shaft, and the lateral sheet and the protruding shaft are limited within an elongated guiding groove in a sliable way, and the elongated guiding groove is formed between the opposite ends of the first main linkage member and a wall surface of the connection housing.

5. The folding-length-difference compensatory mechanism for the multi-step foldable device of claim 1, wherein the connecting housing further has at least one limiting guiding groove and an in-slot limiting pillar; another end of the first sub-linkage member is slid on the at least one limiting guiding groove and is further provided with an operating area and a radially guiding hole, and the radially guiding hole is restrictively movable within a moving range by the in-slot limiting pillar; an end of the first sliding member is also recessed with an accommodating slot to receive a restoring member, and one end of the restoring member is pressed against an inner wall of the at least one limiting guiding groove; a second operating area is further provided on a lateral sheet between the two ends of the first sliding member, and a third operating area and a fourth operating area are respectively provided on both ends of the first intermediate transmission member; the fourth operating area is moved with the second operating area, and the third operating area is moved with the first operating area.

6. The folding-length-difference compensatory mechanism for the multi-step foldable device of claim 1, wherein at least one lateral guiding bar is extended in a direction from the connection housing toward the docking housing, and at least one notch and at least one positioning pillar are provided at the position corresponding to the docking housing for restricting at least one lateral guiding bar to pass;

the opposite surfaces of the first sliding member and at least one lateral guiding bar are respectively provided with a limiting groove and a rod-side protruding block, and the rod-side protruding block is restrictively movable within the limiting groove.

7. The folding-length-difference compensatory mechanism for the multi-step foldable device of claim 1, wherein the connecting housing and the docking housing form respectively step portions that are correspondingly engagable at their respective ends; one of the step portions is provided with a plurality of protruding ribs side by side, and one corresponding step portion is provided with a plurality of long strips side by side, the protruding ribs are intertwined with the long strips, and the protruding ribs and the long strips are guided with each other.

8. The folding-length-difference compensatory mechanism for the multi-step foldable device of claim 1, wherein a third main pivoting portion and a third sub-pivoting portion that are spaced apart from each other are further provided at the opposite ends of the first main body, and the third main pivoting portion and the third sub-pivoting portion are corresponding to the first main pivoting portion and the first sub-pivoting portion to be symmetrically provided at opposite ends of the first main body; the first hinge module further includes a third sliding unit, and the third sliding unit is structurally corresponding to the first sliding unit and the first and third sliding units are symmetrically provided at both ends of the first main body.

9. The folding-length-difference compensatory mechanism for the multi-step foldable device of claim 2, wherein the second sub-linkage member further includes a linkage lever and a linkage plate, and one end of the linkage lever is pivotally connected with the second sub-pivoting portion, and the opposite end of the linkage lever is pivotally connected with one side of the linkage plate to form a pivoting node, and the opposite end of the linkage lever is also protruded to form a protruding shaft, and the protruding shaft and the pivoting node are located at the same rotation axis; the side of the linkage plate is further protruded to form a lateral sheet, such that the lateral sheet is parallel to the protruding shaft and is limited within an elongated guide groove formed between the opposite end of the second main linkage member and a wall surface of the connection housing in a slidable way.

10. The folding-length-difference compensatory mechanism for the multi-step foldable device of claim 3, wherein the second sub-linkage member further includes a linkage lever and a linkage plate, and one end of the linkage lever is pivotally connected with the second sub-pivoting portion, and the opposite end of the linkage lever is pivotally connected with one side of the linkage plate to form a pivoting node, and the opposite end of the linkage lever is also protruded to form a protruding shaft, and the protruding shaft and the pivoting node are located at the same rotation axis; the side of the linkage plate is further protruded to form a lateral sheet, such that the lateral sheet is parallel to the protruding shaft and is limited within an elongated guide groove formed between the opposite end of the second main linkage member and a wall surface of the connection housing in a slidable way.

11. The folding-length-difference compensatory mechanism for the multi-step foldable device of claim 2, wherein the connecting housing further has at least one limiting guiding groove and an in-slot limiting pillar; another end of the second main linkage member is slid on the at least one limiting guiding groove and is further provided with an first operating area, and a second operating area and a radially guiding hole is provided on a lateral sheet between the two ends of the second sliding member, and the radially guiding hole is restrictively movable within a moving range by the in-slot limiting pillar; a third operation area and a fourth operation area are respectively provided at both ends of the second intermediate transmission member, and the fourth operation area is moved with the second operation area, and the third operation area is moved with the first operation area.

12. The folding-length-difference compensatory mechanism for the multi-step foldable device of claim 3, wherein the connecting housing further has at least one limiting guiding groove and an in-slot limiting pillar; another end of the second main linkage member is slid on the at least one limiting guiding groove and is further provided with an first operating area, and a second operating area and a radially guiding hole is provided on a lateral sheet between the two ends of the second sliding member, and the radially guiding hole is restrictively movable within a moving range by the in-slot limiting pillar; a third operation area and a fourth operation area are respectively provided at both ends of the second intermediate transmission member, and the fourth operation area is moved with the second operation area, and the third operation area is moved with the first operation area.

13. The folding-length-difference compensatory mechanism for the multi-step foldable device of claim 2, wherein the second sliding member is further recessed with an accommodating slot to receive a restoring member, and two ends of the restoring member are respectively connected with a curve leg and an inner wall of the second sliding member; a leading surface is provided at an end of the connecting housing; an end of the second sliding member has an inclined surface; a guide surface and a support surface are further formed on one side of the second main linkage member, and the guide surface is adjacent to the end of the second main linkage member, such that the support surface is abutted to the guide surface, and the support surface the guide surface form an angle with each other.

14. The folding-length-difference compensatory mechanism for the multi-step foldable device of claim 3, wherein the second sliding member is further recessed with an accommodating slot to receive a restoring member, and two ends of the restoring member are respectively connected with a curve leg and an inner wall of the second sliding member; a leading surface is provided at an end of the connecting housing; an end of the second sliding member has an inclined surface; a guide surface and a support surface are further formed on one side of the second main linkage member, and the guide surface is adjacent to the end of the second main linkage member, such that the support surface is abutted to the guide surface, and the support surface the guide surface form an angle with each other.

15. The folding-length-difference compensatory mechanism for the multi-step foldable device of claim 2, wherein the opposite end of the second main body further has a fourth main pivoting portion, a fourth sub-pivoting portion, and another blocking portion, and the fourth main pivoting portion, the fourth sub-pivoting portion, and the another blocking portion is corresponding to the second main pivoting portion, the second sub-pivoting portion, and the blocking portion to be symmetrically provided at opposite ends of the second main body; the second hinge module further includes a fourth sliding unit, and the fourth sliding unit is structurally corresponding to the second sliding unit, and the fourth sliding unit and the second sliding unit are symmetrically provided at both ends of the second main body.

* * * * *